US009047090B2

(12) United States Patent
Kottilingal et al.

(10) Patent No.: US 9,047,090 B2
(45) Date of Patent: Jun. 2, 2015

(54) METHODS, SYSTEMS AND DEVICES FOR HYBRID MEMORY MANAGEMENT

(75) Inventors: Sudeep Ravi Kottilingal, San Diego, CA (US); Ramesh Ramaswamy, San Diego, CA (US); Suhail Jalil, San Diego, CA (US); Azzedine Touzni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 13/568,523

(22) Filed: Aug. 7, 2012

(65) Prior Publication Data

US 2014/0047251 A1 Feb. 13, 2014

(51) Int. Cl.
*G06F 1/32* (2006.01)
*G06F 12/10* (2006.01)
*G06F 12/02* (2006.01)
*G06F 12/08* (2006.01)

(52) U.S. Cl.
CPC .......... *G06F 1/3296* (2013.01); *G06F 12/1027* (2013.01); *G06F 12/0292* (2013.01); *G06F 12/08* (2013.01); *G06F 12/10* (2013.01); *G06F 2212/205* (2013.01); *Y02B 60/1225* (2013.01)

(58) Field of Classification Search
CPC ....... G06F 1/3296; G06F 1/32; G06F 1/3225; G06F 1/3275; G06F 12/0292; G06F 12/08; G06F 12/10; G06F 2212/205; Y02B 60/1225
See application file for complete search history.

(56) References Cited

U.S. PATENT DOCUMENTS

| | | | |
|---|---|---|---|
| 5,390,334 A * | 2/1995 | Harrison | 713/324 |
| 2003/0200400 A1 | 10/2003 | Nangle | |
| 2009/0106478 A1 | 4/2009 | Okin et al. | |
| 2009/0222816 A1 | 9/2009 | Mansell et al. | |
| 2010/0064111 A1 | 3/2010 | Kunimatsu et al. | |
| 2011/0093750 A1 | 4/2011 | Williams et al. | |
| 2011/0283071 A1 * | 11/2011 | Yokoya et al. | 711/162 |
| 2012/0079164 A1 | 3/2012 | Hakewill | |
| 2012/0079254 A1 * | 3/2012 | Williams et al. | 712/227 |
| 2012/0079458 A1 | 3/2012 | Williams et al. | |
| 2012/0117304 A1 | 5/2012 | Worthington et al. | |
| 2012/0198140 A1 | 8/2012 | Karamcheti et al. | |

OTHER PUBLICATIONS

International Search Report and Written Opinion—PCT/US2013/045685—ISA/EPO—Oct. 24, 2013.

* cited by examiner

*Primary Examiner* — Dennis M Butler
(74) *Attorney, Agent, or Firm* — Nicholas A. Cole

(57) ABSTRACT

In the various aspects, virtualization techniques may be used to improve performance and reduce the amount of power consumed by translating virtual memory addresses into physical addresses on a computing system having hybrid memory. In a first stage of memory translation, an operating system translates virtual addresses to intermediate physical addresses. In a second stage of memory translation, a chip or virtualization software translates the intermediate physical address to physical addresses based on the characteristics of the physical memory and the characteristics of the processes associated with the physical memory.

104 Claims, 13 Drawing Sheets

METHODS, SYSTEMS AND DEVICES FOR HYBRID MEMORY MANAGEMENT

BACKGROUND

Cellular and wireless communication technologies have seen explosive growth over the past several years. Wireless service providers now offer a wide array of features and services, and provide their users with unprecedented levels of access to information, resources and communications. To keep pace with these service enhancements, mobile electronic devices (e.g., cellular phones, tablets, laptops, etc.) have become more feature rich and complex than ever, and now commonly include multiple processors, system-on-chips (SoCs), multiple memories, and other resources (e.g., power rails, etc.) that allow mobile device users to execute complex and power intensive software applications (e.g., video streaming, multimedia processing, etc.) on their mobile devices. As mobile devices and related technologies continue to grow in popularity and use, improving the performance capabilities and power consumption characteristics of mobile devices are expected to become important and challenging design criteria for mobile device designers.

SUMMARY

The various aspects include methods of managing memory on a computing system having memory, which may include allocating memory space on the computing system by translating the intermediate physical address to a physical address in a monitor agent or a monitor agent process. In an aspect, the monitor agent may assign the physical address based on a characteristic of the memory and a characteristic of one or more processes of the computing system. In an aspect, assign the physical address based on a characteristic of the memory may include assign the physical address based on a characteristic of a hybrid memory. In an aspect, allocating memory space on the computing system may further include translating a virtual address to an intermediate physical address in an operating system.

In a further aspect, allocating memory space on the computing system may include allocating memory space for a software process. In a further aspect, allocating memory space on the computing system may include allocating memory space for a hardware accelerator. In a further aspect, allocating memory space on the computing system may include allocating memory space for a combination of software processes and hardware accelerators.

In a further aspect, assigning the physical address based on a characteristic of the hybrid memory and a characteristic of one or more processes may include assigning the physical address based on one or more of a performance characteristic of the hybrid memory, a power consumption characteristic of the hybrid memory, and a latency characteristic of the hybrid memory. In a further aspect, assigning the physical address based on a characteristic of the hybrid memory and a characteristic of one or more processes may include assigning the physical address based on a performance characteristic of the one or more processes. In a further aspect, the hybrid memory may include two or more types of memory technologies, and assigning the physical address based on a characteristic of the hybrid memory and a characteristic of one or more processes may include assigning the physical address based on the types of memory technologies included in the hybrid memory.

In an aspect, the method may include determining whether the one or more processes include a demanding process. In a further aspect, determining whether the one or more processes include a demanding process may include determining whether the one or more processes include a process associated with one or more of a multimedia application, a video player application, a streaming video application, a virtual reality application, an augmented reality application, a gaming application, a computer vision application, a video conferencing application, a gesture-recognition application, and a speech recognition application.

In a further aspect, assigning the physical address based on a characteristic of the hybrid memory and a characteristic of one or more processes may include assigning a fast portion of the hybrid memory to an application program associated with the demanding process and assigning a slow portion of the hybrid memory to an application program associated with another process when it is determined that the one or more processes include a demanding process. In a further aspect, assigning the physical address based on a characteristic of the hybrid memory and a characteristic of one or more processes may include assigning a fast portion of the hybrid memory to a hardware accelerator associated with the demanding process and assigning a slow portion of the hybrid memory to a hardware accelerator associated with another process when it is determined that the one or more processes include a demanding process.

In a further aspect, the method may include determining memory speed requirements for the demanding process, wherein assigning the physical address based on a characteristic of the hybrid memory and a characteristic of one or more processes may include assigning a fast portion of the hybrid memory to an application program associated with the demanding process and assigning a slow portion of the hybrid memory to an application program associated with another processes in response to determining that the memory speed requirements of the demanding process are high.

In a further aspect, the method may include determining memory speed requirements for the demanding process, wherein assigning the physical address based on a characteristic of the hybrid memory and a characteristic of one or more processes may include assigning a fast portion of the hybrid memory to a hardware accelerator associated with the demanding process, and assigning slow portions of the hybrid memory to one or more hardware accelerators associated with one or more other processes.

In a further aspect, the method may include determining whether the demanding process may be assigned energy-efficient memory, wherein assigning the physical address based on a characteristic of the hybrid memory and a characteristic of one or more processes may include assigning energy-efficient portions of the hybrid memory to an application program associated with the demanding process in response to determining that the demanding process may be assigned energy-efficient memory, and assigning less energy-efficient portions of the hybrid memory to the application program associated with the demanding process in response to determining that the demanding process cannot be assigned energy-efficient memory.

In a further aspect, the method may include determining when the computing system may be entering a lower performance state, wherein assigning the physical address based on a characteristic of the hybrid memory and a characteristic of one or more processes may include assigning energy-efficient portions of the hybrid memory to any software application running on the computing system in response to determining that the computing system may be entering a lower performance state.

In a further aspect, the method may include determining when the computing system may be exiting the lower performance state, wherein assigning the physical address based on a characteristic of the hybrid memory and a characteristic of one or more processes may include reassigning less energy-efficient portions of the hybrid memory to any software application running on the computing system in response to determining that the application requesting memory cannot be assigned energy-efficient memory and that the computing system may be exiting the lower performance state.

In a further aspect, translating the intermediate physical address to a physical address in a monitor agent may include translating the intermediate physical address to a physical address in a hypervisor. In a further aspect, translating the intermediate physical address to a physical address in a monitor agent may include translating the intermediate physical address to a physical address in monitor software outside of the operating system. In a further aspect, translating the intermediate physical address to a physical address in a monitor agent may include translating the intermediate physical address to a physical address in a hardware layer component. In a further aspect, translating the intermediate physical address to a physical address in a monitor agent may include translating the intermediate physical address to a physical address in a software monitor running as part of a device driver.

Further aspects may include a computing device having a processor configured with processor-executable instructions to perform various operations corresponding to the methods discussed above.

Further aspects may include a computing device having a hardware layer component configured to perform various operations corresponding to the methods discussed above.

Further aspects may include a computing device having various means for performing functions corresponding to the method operations discussed above.

Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
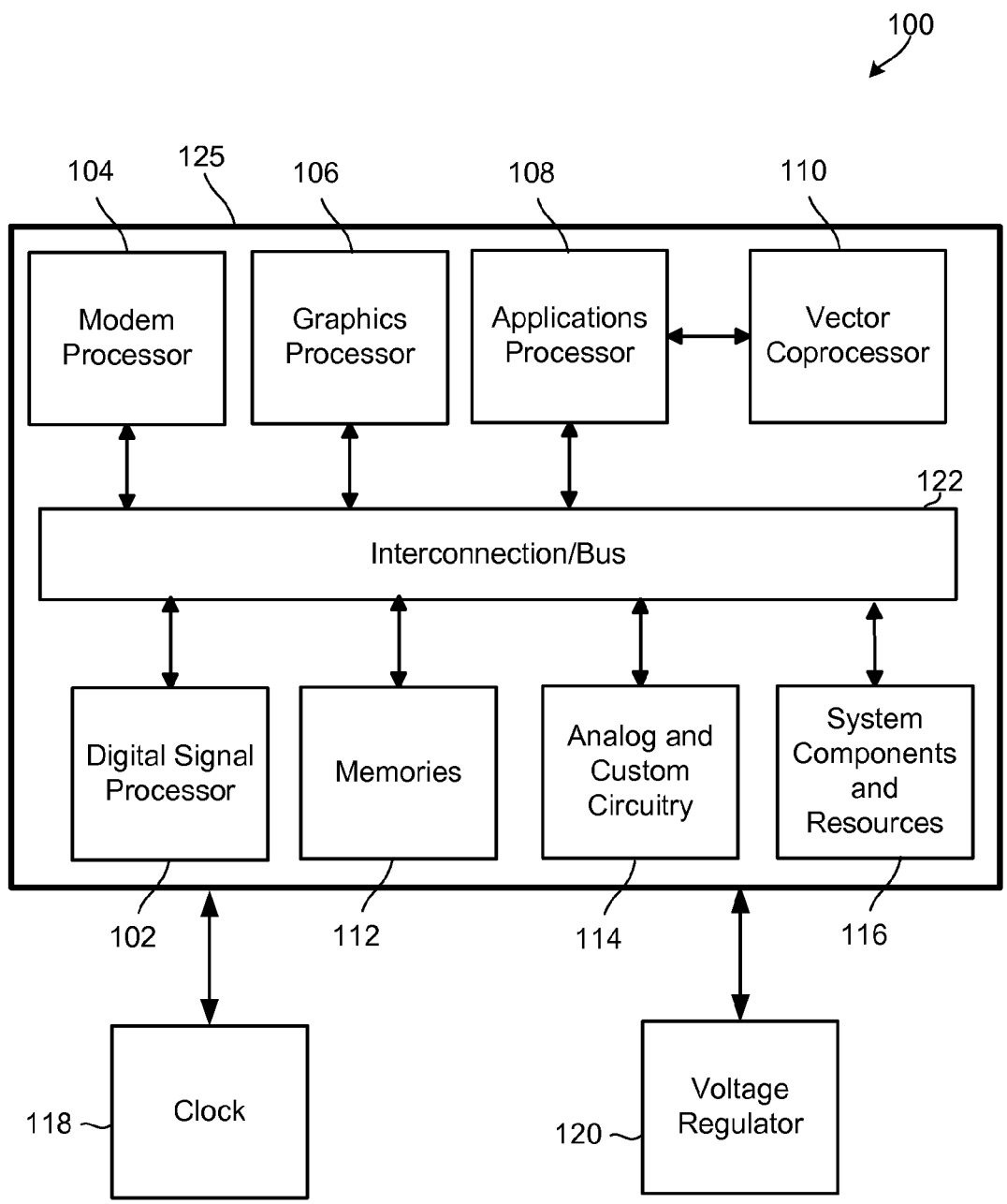
FIG. 1 is a system block diagram illustrating hardware components of a computing device suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," and "computing device" are used interchangeably herein to refer to any one or all of cellular telephones, smartphones, personal or mobile multi-media players, personal data assistants (PDA's), laptop computers, tablet computers, smartbooks, palm-top computers, wireless electronic mail receivers, multimedia Internet enabled cellular telephones, wireless gaming controllers, and similar personal electronic devices which include a programmable processor and a memory, and operate under battery power such that power conservation methods are of benefit. While the various aspects are particularly useful in mobile devices, such as cellular telephones, which have limited processing power and battery capacity, the aspects are generally useful in any computing device that may benefit from improved processor performance and reduced energy consumption.

The term "monitor agent" is used generically herein to refer to any hardware component or software that supports virtualization technology and/or enables the abstraction (or virtualization) of computing resources, including any one or all of hardware monitors, specialized hardware fabricated on the chip, hypervisors, virtual machine monitors, monitor software running outside of a high level operation system (HLOS), and software monitors running as part of device drivers, which may be outside the HLOS, its memory management systems, and/or its allocator functions.

The term "hardware accelerator" is used generically herein to refer to any hardware component configured to perform one or more specialized functions of a general-purpose central processing unit (CPU), or which have been traditionally or historically been performed by the CPU. Examples of hardware accelerators include graphics processing units (GPUs), graphics accelerators (e.g., bit-block transfer units, video or graphics cards, etc.), floating-point accelerators (e.g., math co-processors, etc.), regular expression accelerators, digital signal processors (DSPs), modem processors, vector co-processors, data controllers, memory controllers, system controllers, timers, and other similar hardware components used to support the CPU or client software applications running on a computing device.

The various aspects may also be useful in supporting any demanding, process-intensive, data-intensive, or power-intensive software applications or processes (collectively "demanding processes") running on a computing device. Examples of demanding processes include software applications that generate video output, and thus must process large amounts of video data in and out of memory, such as video player applications, streaming video applications, multimedia applications, virtual reality and augmented reality applications, gaming applications, computer vision applications, video conferencing applications, gesture-recognition applications, speech recognition applications, etc. Demanding processes may also include any processor-intensive and/or data-intensive process for which there is no dedicated hardware, and thus the processing is accomplished in the central processing unit (CPU). Demanding processes may further include any process that requires processing from peripheral devices, such as hardware accelerators.

Modern mobile computing devices may include multiple disjointed memory parts and/or different types of memories. Each of these different memories types/parts may have different performance characteristics relating to writing speed (e.g., time required to write data to the memory), latency, access times (e.g., read access time), security, reliability, power consumption, etc. Such characteristics can significantly impact mobile device performance in terms of execution speed and power consumption. Heterogeneous memory systems and/or memory systems having multiple parts or components with different performance characteristics are referred to herein as "hybrid memory."

Memory interleaving is an advanced memory organization technique that increases memory bandwidth by allowing a processing unit (e.g., a mobile device CPU) to simultaneously access multiple chunks of memory. A memory interleaving scheme may divide the system memory into multiple blocks so that each block of memory may be accessed via a different control line or channel. Each control line/channel may transfer data at the same time as the other control line/channel. Thus, a processing unit of a mobile computing device implementing a memory interleaving scheme may simultaneously issue a first read or write operation to a first block of memory on a first channel, and a second read or write operation to another block of memory on a second channel. Since the processing unit does not have to wait for the completion of the first operation before performing the second operation, the processing unit may access the interleaved memory faster than non-interleaved memory.

A hybrid memory may include both interleaved memories and non-interleaved memories. In an aspect, the interleaved memory parts/portions may be fast memory portions and non-interleaved parts/portions memory may be slow memory portions. In an aspect, the interleaved memory parts may be high performance memory portions. In an aspect, the non-interleaved memory parts may be energy efficient memory portions.

The hybrid memory and/or memory parts/portions may also include any number of different types of memory technologies, including phase change memory (PCM), dynamic random-access memory (DRAM), static random-access memory (SRAM), non-volatile random-access memory (NVRAM), pseudostatic random-access memory (PSRAM), double data rate synchronous dynamic random-access memory (DDR SDRAM), and other random-access memory (RAM) and read-only memory (ROM) technologies known in the art. In an aspect, the hybrid memory may include a PCM memory part and a DRAM memory part. In an aspect, the PCM memory part may be a high latency and/or low power memory portion. In an aspect, the DRAM memory part may be a low latency and/or high power memory portion.

In recent years, mobile computing device architectures have grown in complexity, and may now include multiple processors and hybrid memories. With this rise in complexity, new memory management solutions are required to optimize computing device performance and power consumption. For example, existing memory management systems fail to efficiently consider the specific characteristics of the various memory parts of hybrid memories when allocating data to different elements in a hybrid memory. Thus, existing memory management systems are not able to leverage hybrid memory characteristics in order to improve the computing device's performance and/or reduce the device's power consumption.

The various aspects provide improved computing device memory management systems that enable an operating system to use hybrid memories in a unified manner, improving memory access times and processor performance and/or reducing the amount of power consumed by the computing device. Various aspects enable an operating system to use disjointed hybrid memories in a unified manner without requiring the operating system to know the specifics of the operations that are occurring in each memory access. In particular, various aspects may use a two stage address translation process in which the second stage of address translation is performed in a hardware layer or a hypervisor layer to arrange the memory allocations so that a data load is dynamically balanced and optimized for a given hybrid memory configuration. The various aspects may be implemented within a hypervisor layer and/or chip layer of a computing device so that no modifications to exiting operating systems, peripherals (e.g., hardware accelerators, etc.), or application programs are necessary.

The various aspects may be implemented on a wide variety of single and multi-processor computer architectures, an example of which is illustrated in FIG. 1. A computing device 100 may include a number of heterogeneous processors, such as the illustrated digital signal processor (DSP) 102, modem processor 104, graphics processor 106, and application processor 108. The computing device 100 may also include one or more vector coprocessors 110 connected to one or more of the processors 102-108. Each processor 102-110 may include one or more cores, and each processor/core may perform operations independent of the other processors/cores. Each processor 102-110 may also include a memory (not illustrated) and/or a memory management system controller. In an aspect, the computing device 100 components may be located on a single substrate and/or closely coupled together as a system-on-chip (SOC) 125.

The computing device 100 may include analog circuitry and custom circuitry 114 for managing sensor data, analog-to-digital conversions, wireless data transmissions, and performing other specialized operations, such as processing encoded audio signals for games and movies. The computing device 100 may further include system components and resources 116, such as voltage regulators, oscillators, phase-locked loops, peripheral bridges, data controllers, memory controllers, system controllers, access ports, timers, and other similar components used to support the processors, memories, and clients running on a computing device. Each of system components/resources 116 may further include a memory (not illustrated) and/or a memory management system controller.

In various aspects, the applications processor 108 may be a central processing unit (CPU), a component of a CPU, or a processing unit coupled to a CPU. In an aspect, the CPU may be configured to read and write information to and from the various memories of the processors 102-110, system components/resources 116 and/or peripherals, which may be achieved via the memory management system controllers of the respective processors 102-110, resources 116 and/or peripherals.

The computing device 100 may further include an input/output module (not illustrated) for communications between components and resources, such as a clock 118 and a voltage regulator 120. The processors 102-108 may be interconnected to one or more memory elements 112, resources 116, custom circuitry 114, and various other system components via an interconnection/bus module 122.

As mentioned above, the computing device 100 may include one or more vector coprocessors 110 connected to one or more of the processors 102-108. Such vector coprocessors 110 may be particularly useful for processing applications that require fast and parallel execution, such as multimedia and video streaming applications. In an aspect, the vector coprocessor 110 may implement a single instruction multiple data (SIMD) instruction set architecture (ISA) that includes independent hardware registers, memory, and/or execution hardware. The SIMD vector coprocessor may be a part of, or closely coupled to, the main processor of the computing device 100 (e.g., applications processor 108, CPU, etc.).

Figure 2:
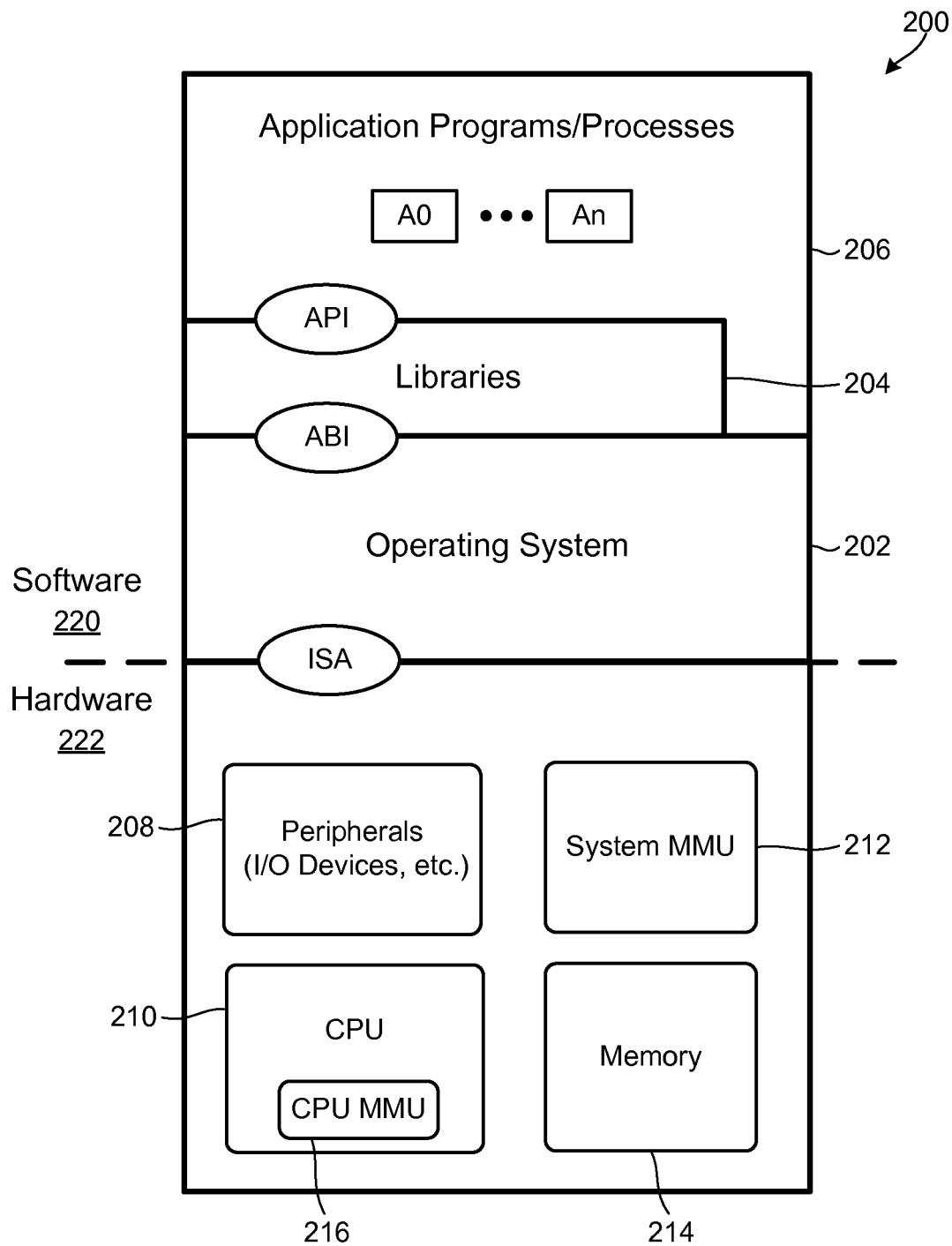
FIG. 2 is a layered computer architectural diagram illustrating logical components and interfaces in a computing system suitable for implementing the various aspects.

FIG. 2 illustrates a layered architecture of a processor showing logical components and interfaces in a typical computer system suitable for implementing the various aspects. The illustrated computer system architecture 200 includes both hardware components 222 and software components 220. The software components 220 may include an operating system 202, a library module 204, and one or more application programs (A0-An) 204. The hardware components 222 may include peripherals 208 (e.g., hardware accelerators, input/output devices, etc.), a central processing unit (CPU) 210, a central processing unit memory management unit (CPU MMU) 216, one or more system memory management units (herein "system MMU" or "SMMU") 212, and one or more memories 214.

Application software written for mobile computing devices may be compiled into executable code, which is what is commonly referred to as "applications," "apps," or application programs 206. Each application program 206 may be a single process or thread, or may include a plurality of processes or threads.

Application programs 206 may issue high-level language (HLL) library calls to the library module 204 via an application program interface (API). The library module 204 may invoke services (e.g., via operating system calls) on the operating system 202 via an application binary interface (ABI). The operating system 202 may communicate with the hardware components using a specific instruction set architecture (ISA), which is a listing of specific operation codes (opcode) and native commands implemented by the hardware 222. In this manner, the ISA defines the hardware 222 as seen by the operating system 202.

The operating system 202 may be responsible for coordinating and controlling the allocation and use of the various memories 214 amongst the application programs 206, which may include partitioning the physical memory across the multiple application programs (A0-An) 206. In an aspect, the operating system 202 may include one or more memory management systems (e.g., a virtual memory manager, etc.) for managing the allocation and use of system memory by the various application programs (A0-An) 206. The memory management systems may function to ensure that the memory used by one process does not interfere with memory already in use by another process.

In an aspect, the operating system 202 may include a virtual memory manager (OS VMM) configured to perform "virtual addressing" operations that enable the operating system 202 to make a particular physical address appear to be another address (i.e., a virtual address). The virtual addressing operations may include allocating virtual memory address to the application programs (A0-An) 206. Including a virtual memory manager within the operating system 202 may simplify the coordination and control of the system memory among the multiple processes or application programs (A0-An) 206.

In addition to the software-based memory management systems (e.g., OS VMM, etc.) discussed above, the system may include one or more hardware-based memory management systems, such as the central processing unit (CPU) memory management unit (MMU) 216 and the system MMU 212 illustrated in FIG. 2. The CPU MMU 216 and the system MMU 212 may each include one or more hardware components responsible for performing various memory related operations, such as the translation of virtual addresses to physical addresses, cache control, bus arbitration, and memory protection. In an aspect, the CPU MMU 216 may be responsible for providing address translation services and protection functionalities to the main CPU 210, and the system MMU 212 may be responsible for providing address translation services and protection functionalities to other hardware components (e.g., digital signal processor, modem processor, graphics processor, etc.).

In various aspects, one or more of the memory management systems (e.g., system MMU 212, CPU MMU 216, etc.) may include a translation look-aside buffer (TLB), which is a cache memory that may be used for memory address translations (e.g., translating virtual addresses to physical addresses, etc.). In an aspect, the translation look-aside buffer (TLB) may be a content-addressable memory (CAM), which may be a hardware associative array memory in which stored information is organized into key-value format (e.g., hash table). The keys may be virtual addresses and the values may be physical addresses. In various aspects, the TLB may be a hardware-managed TLB, a software managed TLB, or any combination thereof. With a hardware-managed TLB, the format of the TLB entries may not be visible to software, and thus may be different for different types of CPUs.

Generally, as part of a memory address translation process, a memory management system (e.g., OS VMM, system MMU 212, CPU MMU 216, etc.) may perform a CAM search to request a physical address from the TLB by sending the TLB a virtual address as the key. If a virtual address key has a corresponding physical address value in the TLB (i.e., a TLB "hit" occurs), the CAM search may retrieve and return the corresponding physical address. If the requested address is not in the TLB (i.e., a TLB "miss" occurs), the memory address translation process may perform a page walk (e.g., a software page walk, hardware page walk, etc.) by reading the contents of multiple memory locations and computing the physical address. After the physical address is determined by the page walk, a virtual address to physical address mapping may be stored in the TLB.

In aspects that include a software-managed TLB, a TLB miss may cause the operating system to walk the page tables and perform the translation in software. In aspects that include a hardware-managed TLB, the memory management system may perform a hardware table walk to determine if a valid page table entry exists for a specified virtual address key.

In the various aspects, the memory 108 may be a hybrid memory having multiple disjointed parts, each of which may have different performance, speed, latency, access times, security, reliability, and/or power consumption characteristics. Due to the differences in performance among the multiple types of memory in a hybrid memory, selecting the proper memory part/portion for holding particular types of application data (e.g., video data vs. text data) can provide significant performance benefits. Likewise, due to differences in power consumption characteristics of the different memories, selecting the proper memory based on the application program (e.g., multimedia vs. text editing, etc.) and/or device state (e.g., sleeping, low power mode, high performance mode, etc.) may significantly improve the power consumption characteristics of the computing device. Improving power consumption characteristics is particularly important for mobile devices, such as smartphones and tablet computers. However, application programs generally do not have insight into the memory structures because such applications are typically written to run on a broad range of devices and/or operating systems, and thus cannot make use of such performance characteristics of hybrid memories.

Current operating systems do not consider the performance or power cost of memory being allocated as part of their memory allocation implementations, and cannot manage hybrid memories efficiently. Thus, operating systems do not enable various types of applications to leverage the performance characteristics of hybrid memories on behalf of applications. There are software techniques like non-unified memory access (NUMA) that associate a cost to each type of memory and select a memory based on a set of policies; however, on mobile devices (e.g., smartphones) the current breed OS kernel does not allow special operations for hybrid memory configurations. In addition, existing solutions simply implement static cost policies, are largely uninformed of the performance characteristics of specific hybrid memories, and changes to the static policies generally require the operating system be recompiled, rebooted, or reinitialized. For these and other reasons, existing memory management solutions fail to efficiently utilize the varying characteristics of different parts of hybrid memories to improve mobile computing device performance for various types of applications in terms of performance and/or power efficiency.

The various aspects provide memory management systems that utilize virtualization techniques to enable an operating system to use disjointed hybrid memories in a unified manner. Virtualization technologies enable the abstraction (or virtualization) of computing resources, which may be achieved by placing a control program (e.g., a Virtual Machine Monitor "VMM" or hypervisor) between the operating system and the hardware. Virtualization techniques are commonly implemented in a virtual machine (VM), which may be a software application that executes application programs like a physical hardware machine. The virtual machine provides an interface between application programs and the execution hardware, allowing application programs tied to a specific ISA to execute on hardware implementing a different ISA.

Figure 3:
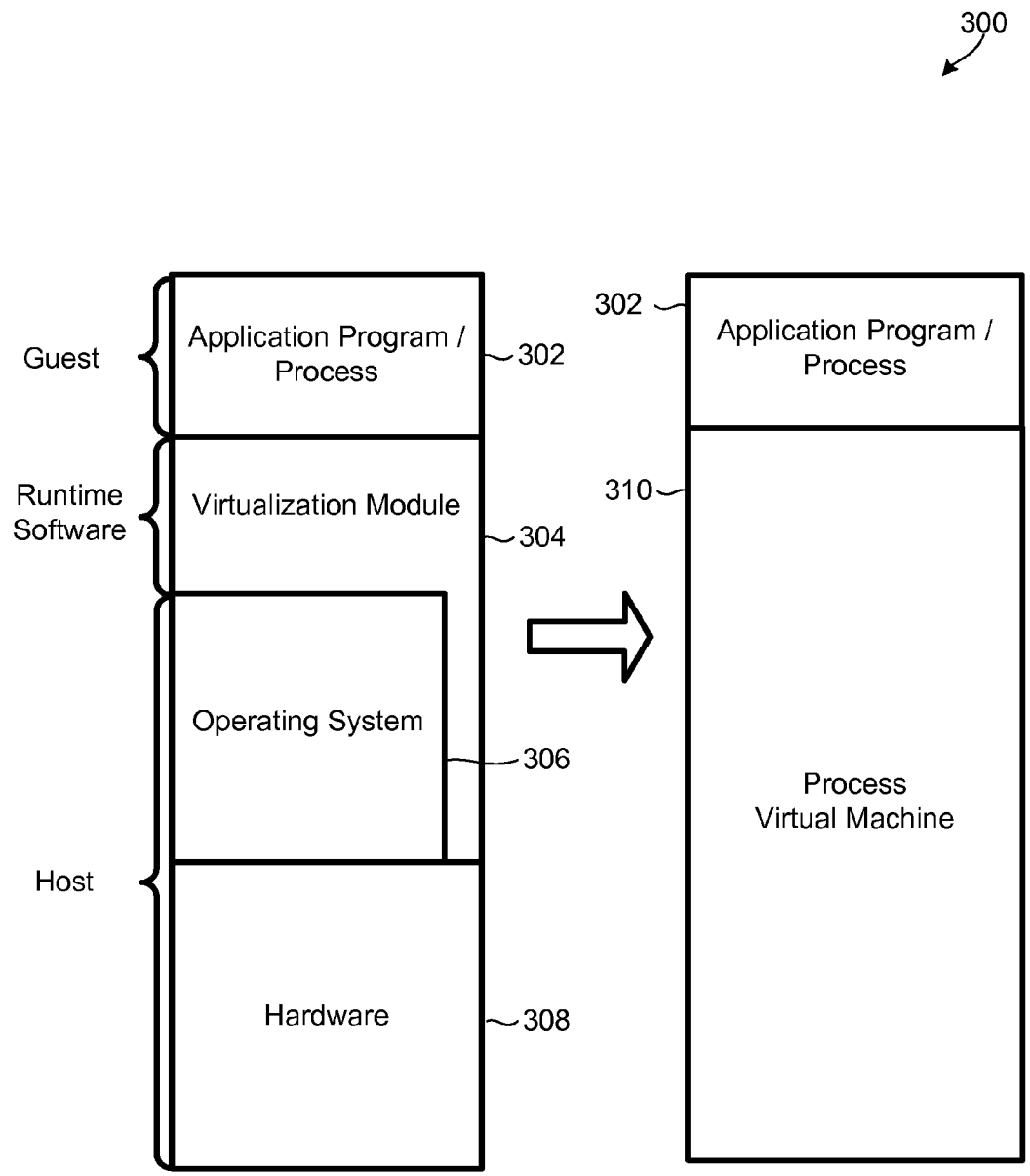
FIGS. 3 and 4 are layered computer architectural diagrams illustrating logical components in virtual machines suitable for implementing the various aspects.
Figure 4:
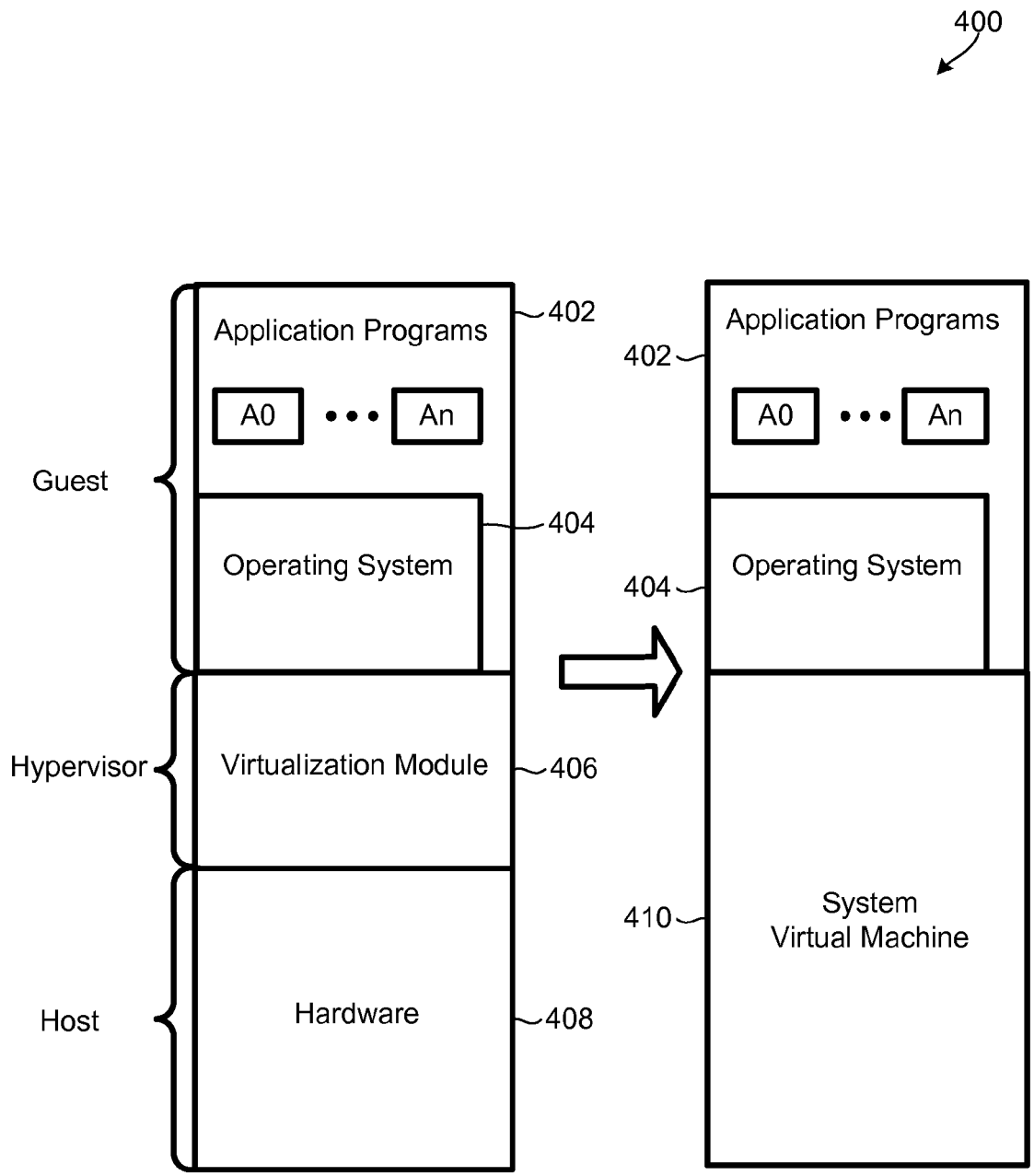

FIGS. 3 and 4 illustrate logical components in a typical computer system implementing a virtual machine. Virtual machines may be categorized into two general categories: system virtual machines; and process virtual machines. System virtual machines allow the sharing of the underlying physical hardware between different processes or applications. Process virtual machines, on the other hand, support a single process or application.

FIG. 3 is a layered architectural diagram illustrating logical layers of a computing device 300 implementing a process virtual machine 310. The computer system 300 may include hardware 308 and software components that include an application process module 302, a virtualization module 304, and an operating system 306.

As discussed above with reference to FIG. 2, since hardware components are only visible to the application programs 206 through the operating system 202, and the ABI and API effectively define the hardware features available to the application programs 206. The virtualization software module 304 may perform logical operations at the ABI/API level and/or emulate operating system calls or library calls such that the application process 302 communicates with the virtualization software module 304 in the same manner it would otherwise communicate with hardware components (i.e., via system/library calls). In this manner, the application process 302 views the combination of the virtualization module 304, operating system 306, and hardware 308 as a single machine, such as the process virtual machine 310 illustrated in FIG. 3. This simplifies the job of the application developer since application software need not be concerned with the actual architecture of computing devices on which the application will ultimately execute.

The process virtual machine 310 exists solely to support a single application process 302, and is therefore created with the process 302 and terminated when the process 302 finishes execution. The process 302 that runs on the virtual machine 310 is called the "guest" and the underlying platform is called the "host." Virtualization software 304 that implements the process virtual machine is typically called runtime software (or simply "runtime").

FIG. 4 is a layered architectural diagram illustrating the logical layers in a computing device 400 implementing a system virtual machine 410. The computer system may include hardware components (e.g., execution hardware, memory, I/O devices, etc.) 408 and software components that include an application programs module 402, an operating system 404, and a virtualization module 406. Software that runs on top of the virtualization module 406 is referred to as "guest" software and the underlying platform that supports the virtualization module is referred to as "host" hardware.

Unlike process virtual machines, a system virtual machine 410 provides a complete environment on which the multiple operating systems (called "guest operating systems") can coexist. Likewise, the host hardware platform may be configured to simultaneously support multiple, isolated guest operating system environments. The isolation between the concurrently executing operating systems adds a level of security to the system. For example, if security on one guest operating system is breached, or if one guest operating system suffers a failure, the software running on other guest systems is not affected by the breach/failure. The host hardware platform also simplifies the job of the application developer since application software need not be concerned with the actual architecture of computing devices on which the application will ultimately execute.

The virtualization software module 406 may be logically situated between the host hardware and the guest software.

The virtualization software may run on the actual hardware (native) or on top of an operating system (hosted), and is typically referred to as a "hypervisor" or virtual machine monitor (VMM). In native configurations, the virtualization software runs on the actual hardware in the highest privilege mode available, and the guest operating systems run with reduced privileges such that the virtualization software can intercept and emulate all guest operating system actions that would normally access or manipulate the hardware resources. In hosted configurations, the virtualization software runs on top of an existing host operating system, and may rely on the host operating system to provide device drivers and other lower-level services. In either case, each of the guest operating systems (e.g., operating system 404) communicates with the virtualization software module 406 in the same manner they would communicate with the physical hardware 408, viewing the combination of the virtualization module 406 and hardware 408 as a single, virtual machine 410. This allows each guest operating system (e.g., operating system 404) to operate under the illusion of having exclusive access to processors, peripherals, I/O, MMUs, and memories in the hardware 408.

As discussed above with reference to FIG. 2, an operating system may be responsible for partitioning the physical memory across multiple processes. This may be achieved via a memory address space translation process. In a memory address space translation process the operating system assigns virtual addresses (VAs) to each application program, and then allocates the physical memory addresses (PAs) based on the virtual addresses (VAs) before the program's execution. However, in systems that include a guest operating system running on top of a virtual machine, the memory addresses allocated by the guest operating system are not the true physical addresses (PAs), but intermediate physical addresses (IPAs). In such systems, the actual allocation of the physical memory is generally performed by the hypervisor, which may be required to maintain the relationships between the virtual addresses (VAs), the intermediate physical addresses (IPAs), and the physical addresses (PAs).

Most processors systems only support a single stage of the memory address translation process, and require the hypervisor to manage the relationship between virtual addresses (VA), intermediate physical addresses (IPA), and physical addresses (PA). This is generally achieved by the hypervisor maintaining its own translation tables (called shadow translation tables), which may be derived by interpreting each of the guest operating system's translation tables. On such systems, the hypervisor must ensure that all changes to the guest operating system's translation tables are reflected in the shadow structures, as well as enforcing protection and redirecting access faults to the appropriate stage. These operations increase the complexity of the hypervisor, and add significant overheads to executing, maintaining, and/or managing the hypervisor. On mobile devices, these added complexities and overheads may have a significant impact on performance.

Unlike the single stage processors discussed above, some processor systems (e.g., ARM v7-A) provide hardware assistance for both stages of memory translation. For example, ARM processors may include Virtualization Extensions that enable the guest operating system to translate the virtual addresses (VA) to intermediate physical addresses (IPA) in a first stage, and for hardware to translate the intermediate physical addresses (IPA) to physical addresses (PAs) in a second stage. Such Virtualization Extensions reduce the overheads associated with executing, maintaining, and/or managing the hypervisor, and improve computing device performance.

Figure 5:
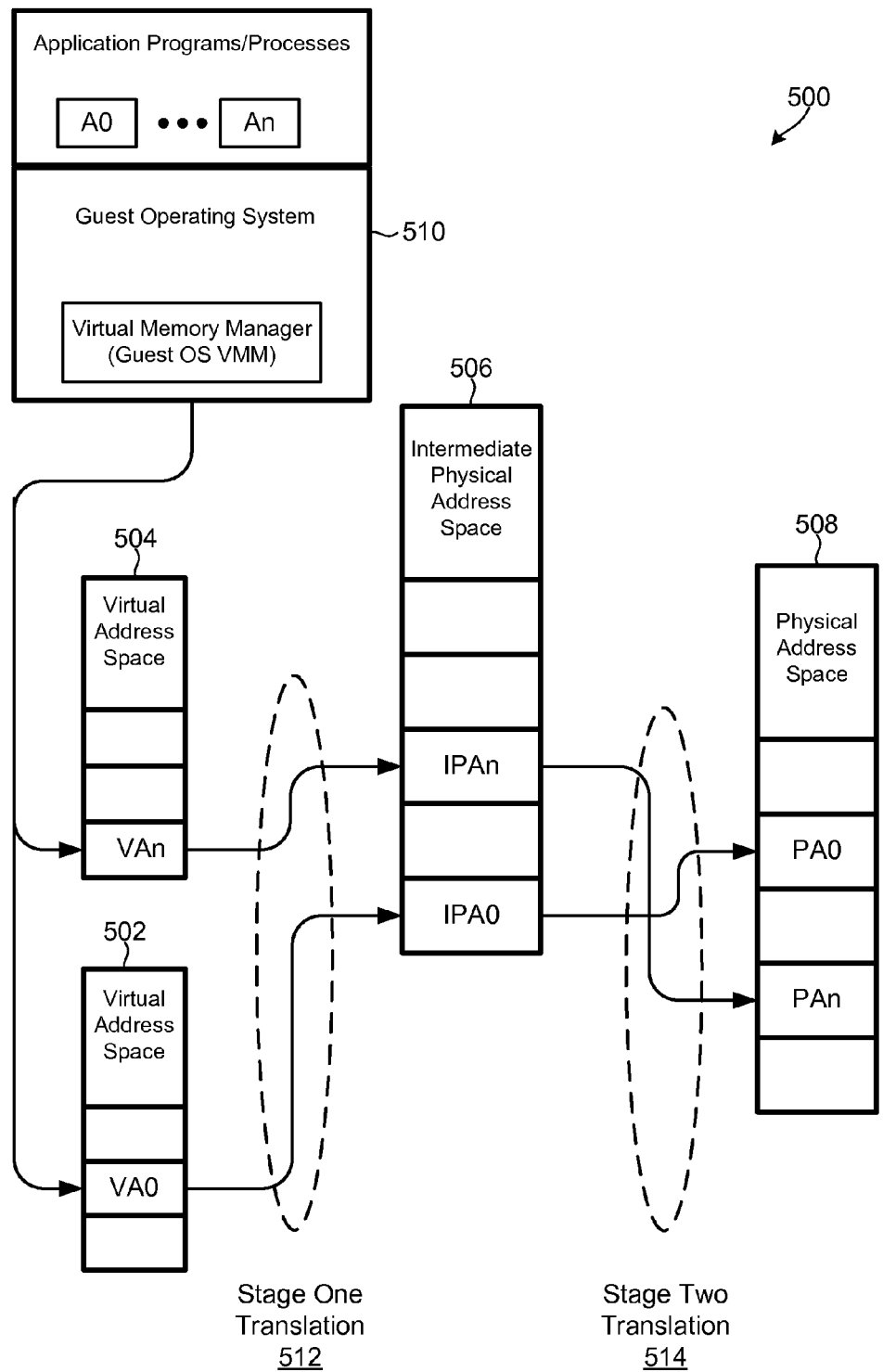
FIG. 5 is a component flow diagram illustrating logical components and data flows associated with allocating memory in two stages on a computing device implementing a system virtual machine.

FIG. 5 illustrates example logical components and address translations associated with allocating memory in two stages on a computing device 500 implementing a system virtual machine. A memory management system of a guest operating system 510 may assign a virtual address space 502, 504 to each of the application programs/processes (A0, An). For example, the virtual address spaces 502, 504 may be assigned by a virtual memory manager (e.g., Guest OS VMM). Each application program/process (A0, An) may be assigned its own virtual address space 502, 504, and each virtual address space 502, 504 may include one or more virtual addresses VA0, VAn.

In example illustrated in FIG. 5, the memory addresses are translated in two stages. In a first translation stage 512, the guest operating system's virtual memory manager (Guest OS VMM) may map the virtual addresses VA0, VAn to intermediate physical addresses IPA0, IPAn in an intermediate physical address space 506. In a second translation stage 514, the hypervisor and/or virtualization extensions may map the intermediate physical addresses IPA0, IPAn to physical addresses PA0, PAn in a physical address space 508. The first translation stage 512 may be performed independently of the second translation stage 514, and in existing systems, the components performing the second stage translations 514 do not allocate the physical addresses based on the characteristics of the memory.

As mentioned above, virtualization extensions may enable translating every memory address two times (e.g., via one base table for translating VA to IPA and a second base table for translating IPA to PA). The various embodiments may use these two-stage translation techniques/features to allow an operating system to use hybrid or disjointed memories in a unified manner. In doing so, the various embodiments may optimize memory usage by allocating data to the type of memory that best suits its needs, without requiring the operating system to know the specifics of the operations that are occurring in each memory access.

Figure 6A:
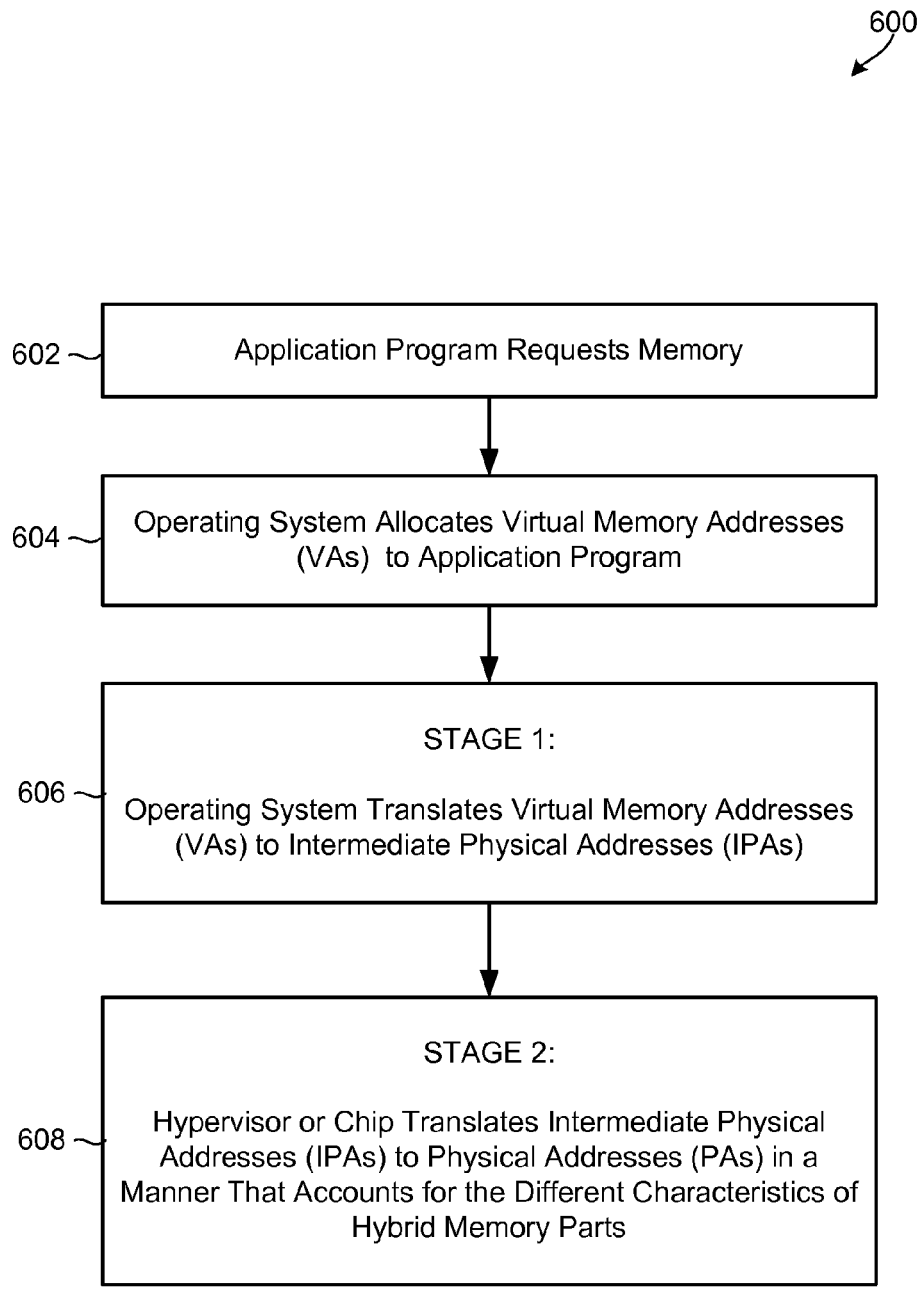
FIG. 6A is a process flow diagram illustrating an aspect method for allocating memory in two stages in a manner that accounts for the characteristics of different parts of a hybrid memory.

FIG. 6A illustrates an aspect method 600 of allocating memory in two stages based on the specific characteristics of various memory parts of a hybrid memory. In block 602, an application program may request allocation of memory space from an operating system, which may be a guest operating system running on a hypervisor. In block 604, the operating system may allocate virtual memory addresses to the application program in response to the request. In block 606, the operating system, which may not be aware of different memory configurations underlying in the hardware platform, may perform the first stage of the address translation process by translating the virtual memory addresses (VAs) to intermediate physical addresses (IPAs). In block 608, the chip or virtualization software may perform a second stage of address translation by translating the intermediate physical addresses (IPAs) to physical address (PAs) in a manner that accounts for the different characteristics of the application program and/or the various parts of the hybrid memory. In an aspect, as part of block 608, the chip or virtualization software may arrange the physical memory pages so that the data load is balanced and optimized for a given hybrid memory configuration.

Figure 6B:
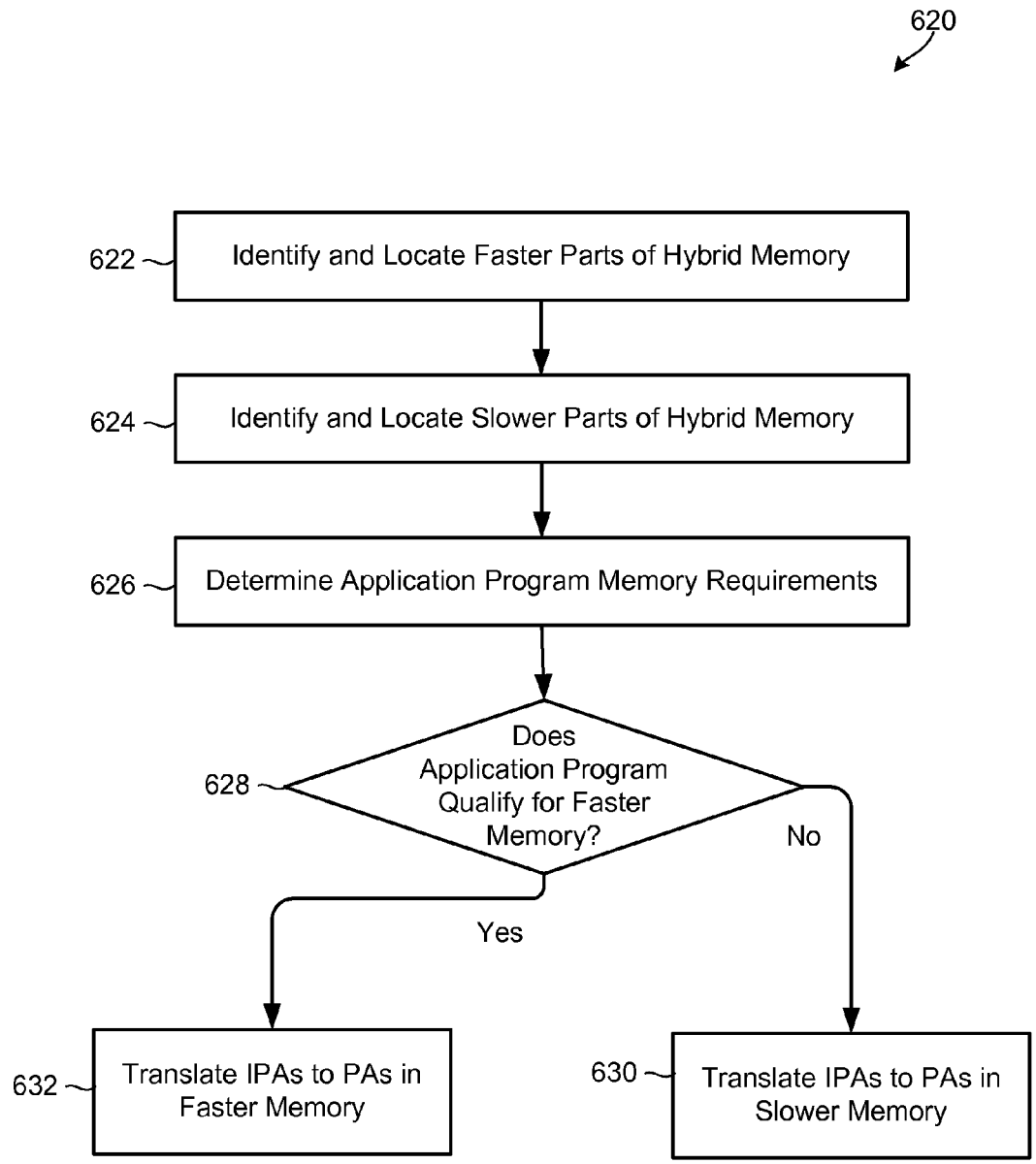
FIG. 6B is a process flow diagram illustrating an aspect method for allocating physical address based on the memory requirements of an application program and memory access speeds of different parts of a hybrid memory.

FIG. 6B illustrates an aspect method 620 of allocating physical address based on the memory requirements of an application program and access speed characteristics of a hybrid memory. In block 622, a chip or virtualization software may identify and locate the faster parts of a hybrid memory. In block 624, the chip or virtualization software may identify and locate the slower parts of the hybrid memory. The operations of identifying the faster and slower memory segments or parts in a hybrid memory may be accomplished at any time, such as part of an initial configuration set up process, as part of a boot process performed at power-on, or as part of loading an application. In block 626, the chip or virtualization software may determine the memory requirements of the application program. For example, the chip or virtualization software may determine whether the application program relates to video streaming/processing or other technologies that place a high demand on the system to provide or process data, and thus would benefit from using faster memory segments. Alternatively, the chip or virtualization software may determine whether the application program employs data in a manner that is not time-sensitive, and thus can be allocated slower memory without impacting the application's performance.

In determination block 628, the chip or virtualization software may determine whether the application program meets the requirements for being assigned faster portions of the hybrid memory (e.g., relates to video streaming/processing, etc.). If it is determined that the application program does not meet the requirements for being assigned faster portions of the hybrid memory (i.e., determination block 628="No"), in block 630, the chip or virtualization software may translate the intermediate physical addresses (IPAs) associated with the application program to physical addresses (PAs) in the identified slower parts of the hybrid memory. If it is determined that the application program meets the requirements for being assigned faster portions of the hybrid memory (i.e., determination block 628="Yes"), in block 632, the chip or virtualization software may translate the intermediate physical addresses (IPAs) associated with the application program to physical address (PAs) in the identified faster parts of the hybrid memory.

The various aspects may be useful in supporting any demanding, complex, or power intensive application running on a computing device that will benefit from accessing faster memory. Examples include applications that generate video output, and thus must process large amounts of video data in and out of memory, such as video player applications, streaming video applications, multimedia applications, virtual reality and augmented reality applications, gaming applications, computer vision applications, video conferencing applications, gesture-recognition applications, speech recognition applications, etc. The various aspects may also be generally useful for any process-intensive and/or data-intensive processing for which there is no dedicated hardware and thus the processing is accomplished in the central processing unit (CPU). As another example, the various aspects may be useful for allocating memory to various peripheral devices that are providing or using large amounts of data, and thus can benefit from having preferential access to faster memory segments.

Figure 6C:
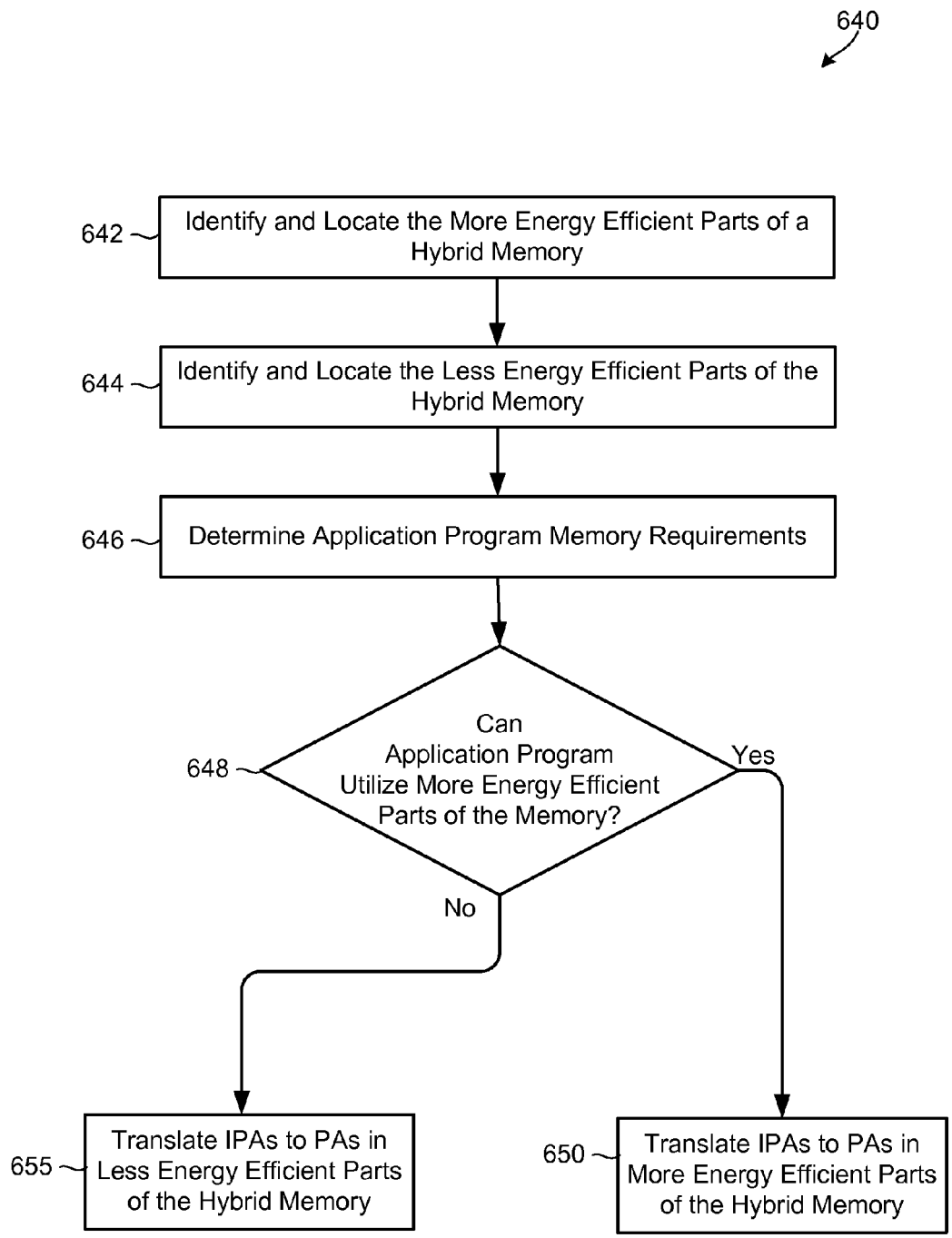
FIG. 6C is a process flow diagram illustrating an aspect method for allocating physical address based on the memory requirements of an application program and energy consumption characteristics of different parts of a hybrid memory.

FIG. 6C illustrates an aspect method 640 of allocating physical address based on the memory requirements of an application program and energy consumption characteristics of a hybrid memory. In block 642, a chip or virtualization software may identify and locate the more energy efficient parts of a hybrid memory. In block 644, the chip or virtualization software may identify and locate the less energy efficient parts of the hybrid memory. Similar to method 620 described above, the operations of identifying the more and less energy efficient memory segments or parts in a hybrid memory may be accomplished at any time, such as part of an initial configuration set up process, as part of a boot process performed at power-on, or as part of loading an application. In block 646, the chip or virtualization software may determine the memory requirements of the application program in a manner that may be related to the energy consumption characteristics of the memory. For example, the chip or virtualization software may determine whether the application program uses data in a manner that will not be impacted if the data is stored in power-efficient memory instead of other portions of the hybrid memory that might be faster to write or access but consume more power.

In determination block 648, the chip or virtualization software may determine whether the application program can be supported in terms of memory allocations by more efficient memory segments or requires less energy efficient portions of the hybrid memory (e.g., relates to video streaming/processing, etc.). If it is determined that the application program can be assigned to more energy efficient portions of the hybrid memory (i.e., determination block 648="Yes"), in block 650, the chip or virtualization software may translate the intermediate physical addresses (IPAs) associated with the application program to physical address (PAs) in the identified more energy efficient parts of the hybrid memory. If it is determined that the application program cannot utilize the more energy efficient memory or requires assignment of less energy efficient portions of the hybrid memory (i.e., determination block 648="No"), in block 652, the chip or virtualization software may translate the intermediate physical addresses (IPAs) associated with the application program to physical address (PAs) in the identified less energy efficient parts of the hybrid memory.

The various aspects may also be useful in allowing a computing system to save power when entering a reduced power state, such as an idle or low power mode as may be implemented after a period of inactivity. Since an application running on the computing system is unlikely to require high performance memory during such an idle or lower-power state, the user would not notice a performance reduction that might occur from using more power-efficient, though slower, memory to support the applications. Thus, when the chip or virtualization software detects or is informed by the operating system that the computing system is entering a lower performance state (e.g., idle, low-power or sleep mode), it may determine that all application programs can be assigned to more energy efficient portions of the hybrid memory (i.e., determination block 648="Yes" for all applications), and in block 650 of method 640, the chip or virtualization software may translate the intermediate physical addresses (IPAs) associated with all application programs to physical address (PAs) in the identified more energy efficient parts of the hybrid memory. Conversely, when the chip or virtualization software detects or is informed by the operating system that the computing system is returning to a performance state (e.g., exiting an idle or low-power mode), it may return to block 646 of method 640 to determine the application program memory requirements for active programs, and determine in block 648 whether any of the memory assignments made when entering the lower power state need to be changed to translate the intermediate physical addresses (IPAs) to physical address (PAs) in the identified less energy efficient parts of the hybrid memory for application programs that cannot use energy-efficient memory without experiencing a performance hit.

Figure 7:
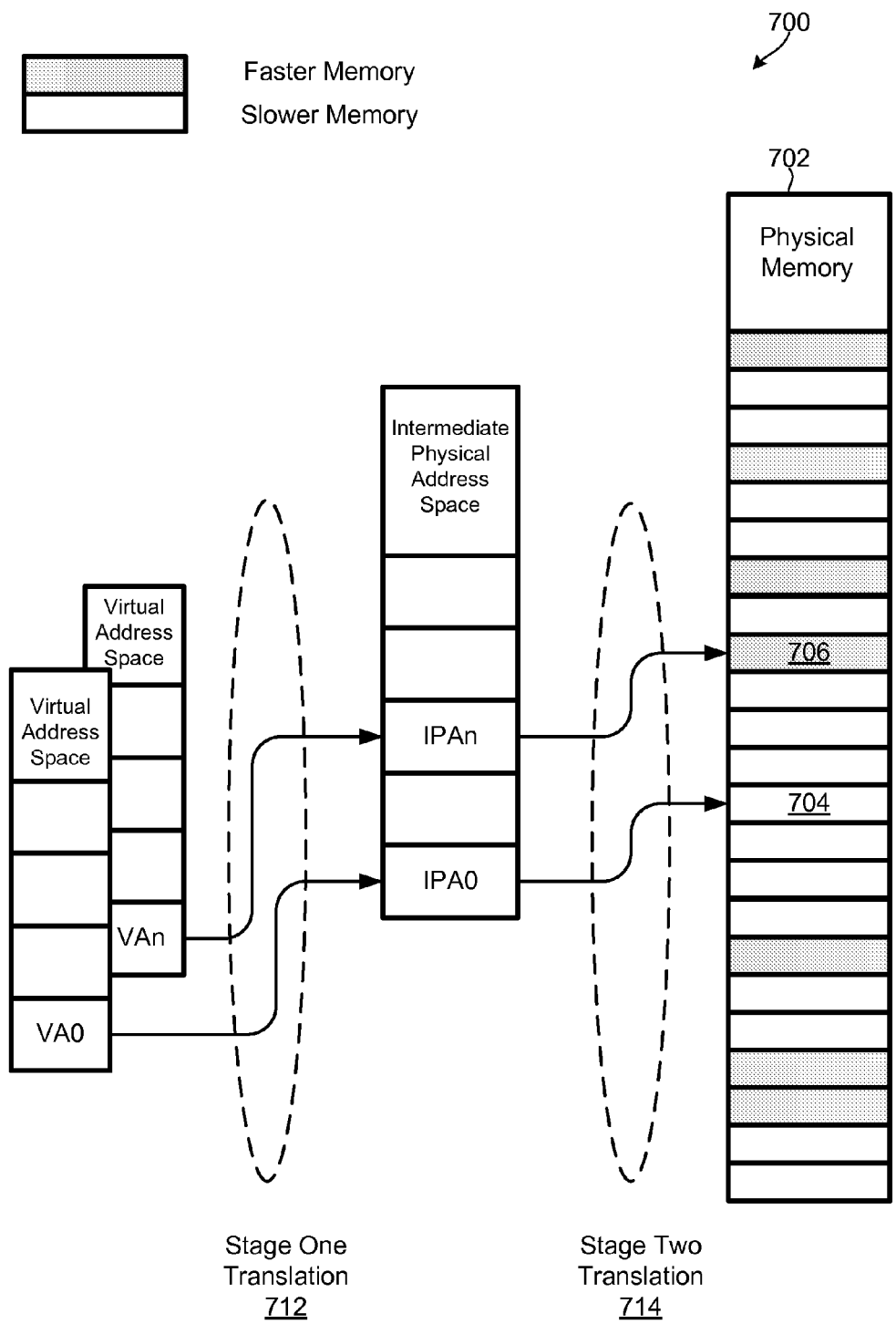
FIG. 7 is a memory architecture and message flow diagram illustrating data flows associated with allocating memory in two stages on a computing device implementing a system virtual machine in accordance with an aspect.

FIG. 7 illustrates example logical components and transformations in an example computing system 700 configured to perform a two-stage address translation process based on the specific characteristics of various memory parts of a hybrid memory in accordance with the various aspects. In the example illustrated in FIG. 7, the computing system 700 includes physical memory 702 having faster memory portions and slower memory portions. An operating system (e.g., a guest operating system) of the computing system 700 may assign a first virtual address (VA0) to a first application program (A0) having a relatively low priority, complexity, and/or memory requirements (e.g., a text editor application). The operating system may assign a second virtual address (VAn) to a second application program (An) having a relatively high priority, complexity, and/or memory requirements (e.g., a video processing application).

In a first translation stage 712, the operating system may translate virtual addresses VA0, VAn to intermediate physical addresses IPA0, IPAn. In a second translation stage 714, the virtualization software or chip may intelligently translate the intermediate physical addresses IPA0, IPAn to physical addresses such that application program (A0) is assigned a slower block of memory 704 (or more energy-efficient memory) and application program (An) is assigned a faster block of memory 706. The intelligent translations of intermediate physical addresses may be achieved via a segregation-aware second stage translator implemented in the chip or virtualization software and configured to distribute, allocate, and/or assign the memory in an intelligent manner.

In an aspect, the intelligent translations of intermediate physical addresses may be performed by chip or virtualization software based on the accessing performance (e.g., access speed) and/or energy consumption models to dynamically allocate the physical memory based on the current performance/energy consumption characteristics of the hybrid memory.

The performance and/or energy consumption models may include data-structures (e.g., list, array, table, map, etc.) storing information for monitoring each application program, unit of code, cores/processors, memory parts, and the amount of time/power necessary to perform memory read/write operations for the respective application programs/unit of code, for a particular core/processor and/or memory part. The energy consumption models may also store information for identifying alternative, more efficient memories or memory parts for each application program. In various aspects, the energy consumption models may be supplied by the virtualization software authors, chip designers, the authors of the application programs, or memory manufacturers.

In an aspect, the energy consumption models may be constructed or adjusted by the virtual software or chip while operating (i.e., at runtime) using a machine learning procedure. Such a machine learning procedure may be implemented as the computing device executes object code and/or access the memories to monitor writing and access times, and/or power requirements for writing, maintaining, and accessing data in order to generate memory performance data. From such memory performance data, the machine learning procedure may generate new performance and/or energy consumption models or update performance and/or energy consumption models that were previously generated or supplied by a device/hardware manufacturer or software vendor. For example, the virtual software may be configured to construct an energy consumption model based on read/write time and/or power consumption information collected from previous memory read/write operations by using machine learning techniques.

A variety of feedback and machine learning techniques may be used for generating and modifying memory performance and energy consumption models. For example, optimization rules may be changed or adjusted when the measured results depart from the model predictions. As another example, machine perturb and test method experiments may be performed by the virtual software. Machine perturb and test method experiments may involve changing an optimization rule, comparing the measured power consumption of memory accesses before and after the change in the optimization rule, and selecting for use the changed optimization rule if it provides best results. In an aspect, the power performance of different lengths of memory may be compared to one another to recognize patterns to enable better optimization to occur.

Using feedback and learning mechanisms to generate and/or adjust memory performance and energy consumption models present a number of advantages. For example, the feedback and learning mechanisms may enable the computing system to accommodate changes in hardware performance that occur after the initial design is set (e.g., addition of new memory, substitution of a processor, etc.) after the model is designed. Such changes may occur from lot-to-lot of memory chips from the same vendor, when memory is purchased from more than one vendor, when new hardware is added to the system, and over time due to changes in the system performance. Thus, the feedback and learning mechanisms may enable the various aspects to better account for lot-to-lot and line-to-line variability in memory access speeds and power consumption characteristics.

In a further aspect, the chip or virtualization software may be configured to rearrange or reallocate memory among the different parts of the hybrid memory. This capability may enable further application performance improvements in terms of speed and/or power consumption without the knowledge or involvement of either the application programs or the operating systems.

Figure 8A:
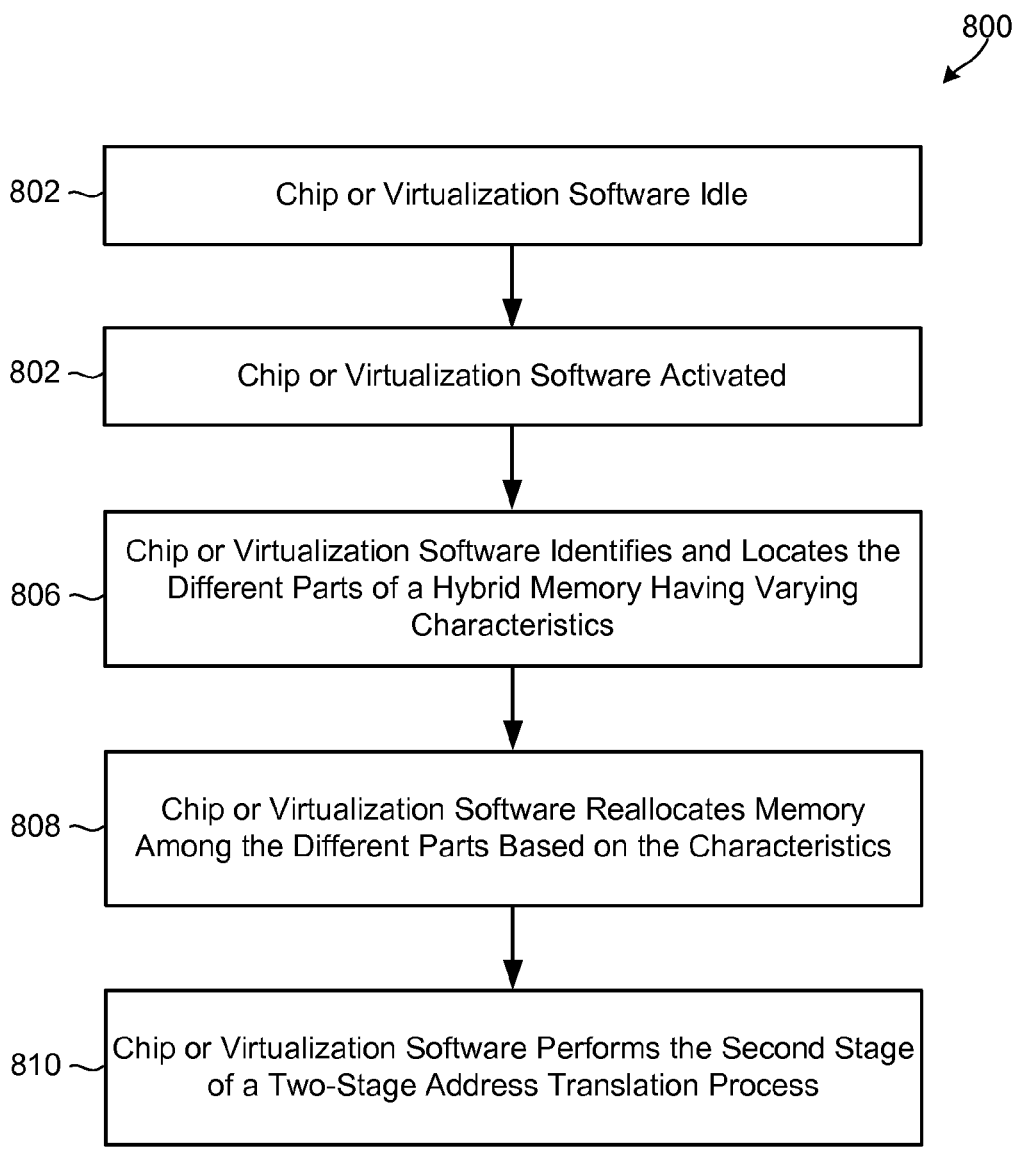
FIG. 8A is a process flow diagram illustrating an aspect method of reallocate memory among the different parts of the hybrid memory.

FIG. 8A illustrates an aspect method 800 of reallocate memory among the different parts of the hybrid memory. In block 802, a chip or virtualization software of a computing device may be in an idle state. In block 804, the chip or virtualization software may be activated in response to a request to read/write from physical memory, for example. In block 806, the chip or virtualization software may scan the various portions of the hybrid memory to identify and locate the different memory portions having varying characteristics. For example, the chip or virtualization software may scan the memory to identify faster memory portions, more energy efficient portions, portions having high latency, etc. In block 808, the chip or virtualization software may defragment the hybrid memory such that the faster portions (or more efficient portions, etc.), references to the faster portions, or information stored in the faster portions are located in close proximity to each other. In block 810, the chip or virtualization software may perform the second stage of the two-stage address translation process.

Figure 8B:
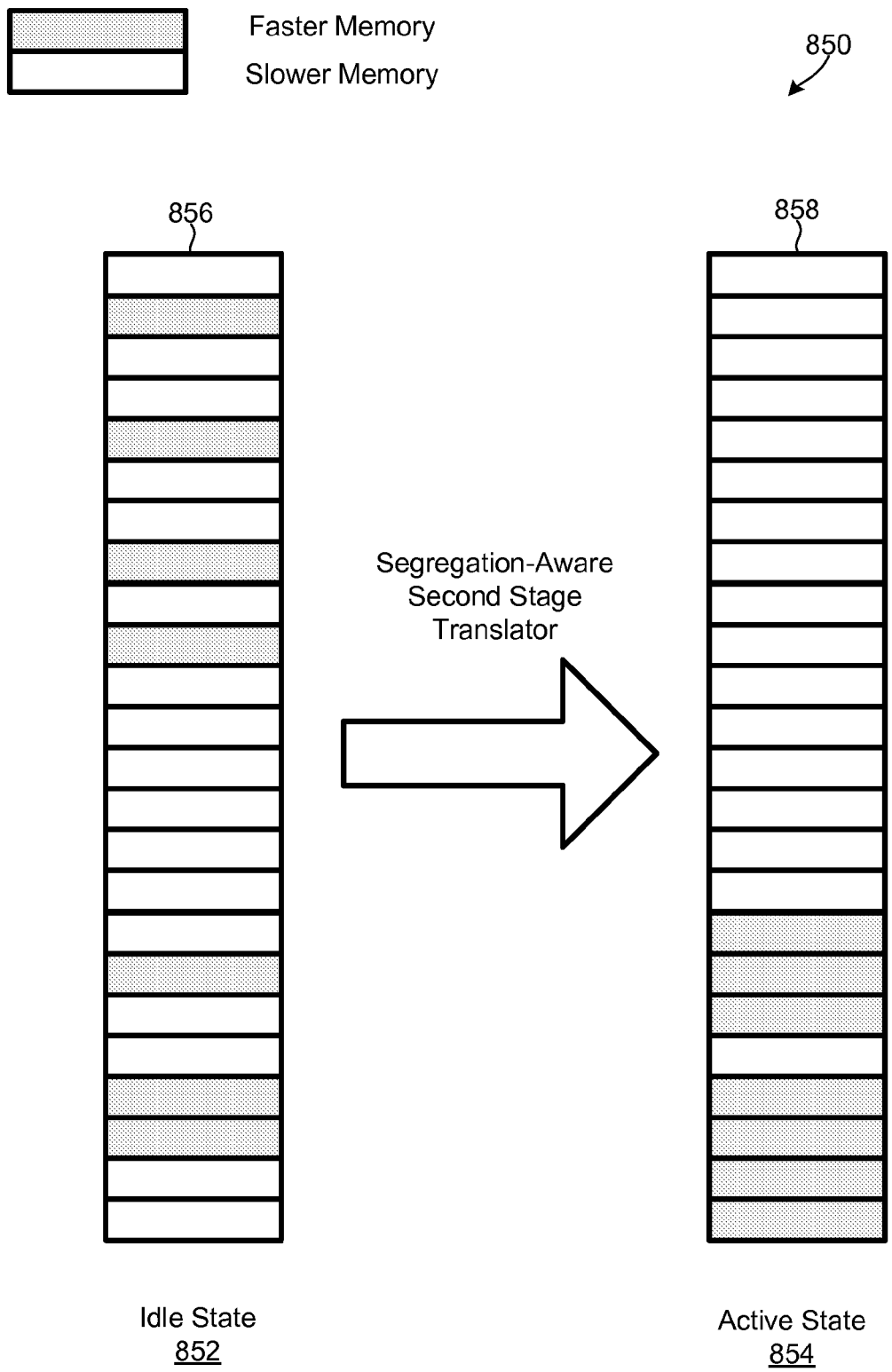
FIG. 8B is a memory address diagram illustrating transformations associated with rearranging memory among the different parts of a hybrid memory.

FIG. 8B illustrates logical components and transformations in computing system 850 configured to rearrange or reallocate memory among the different parts of the hybrid memory. As discussed above, a segregation-aware second stage translator implemented in the chip or virtualization software may be configured to distribute, allocate, and/or assign memory in an intelligent manner. FIG. 8B illustrates that while the segregation-aware second stage translator is in an idle state 852, the faster and slower portions of a hybrid memory 856 may be disturbed throughout the memory 856. When in an active state 854, the segregation-aware second stage translator may rearrange or reallocate memory among the different parts of the hybrid memory 858 such that the faster memory portions are in closer proximity to one another.

On computing systems that include one or more memory management units (e.g., a system MMU or SMMU) configured to provide address translation services, various aspects may track the memories mapped into any peripheral MMU instance and prevent those memories from becoming a candidate for reclaiming.

Figure 9:
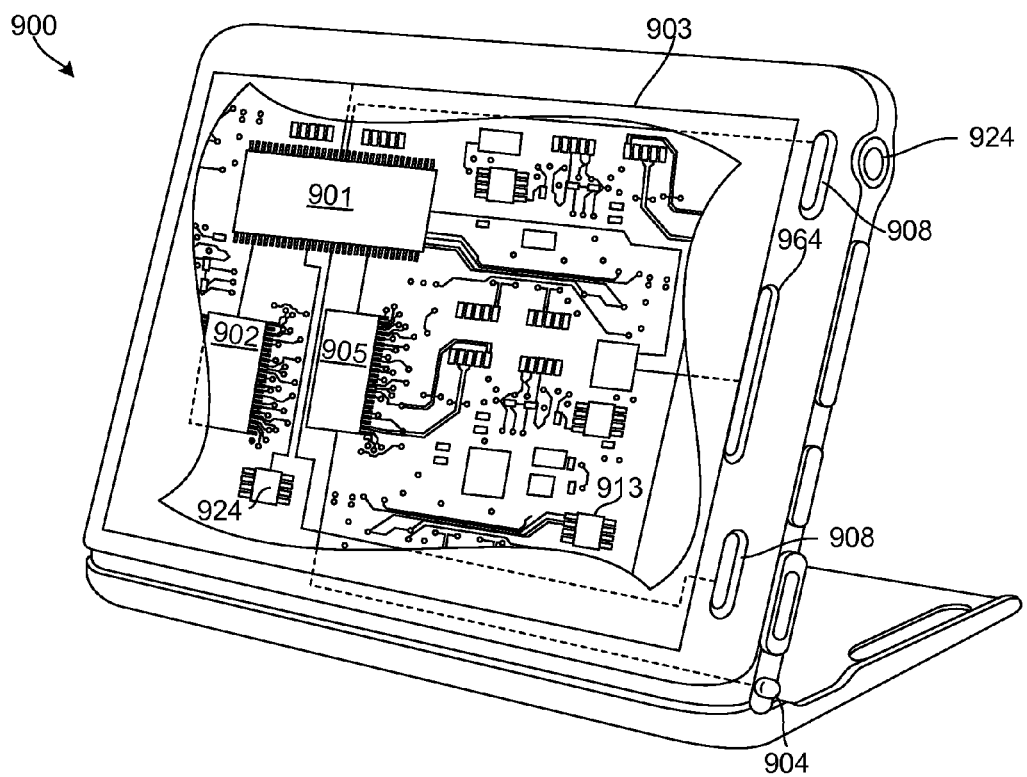
FIG. 9 is a component block diagram illustrating a mobile device suitable for implementing the various aspects.

Typical mobile devices 900 suitable for use with the various aspects will have in common the components illustrated in FIG. 9. For example, an exemplary mobile device 900 may include a processor 902 coupled to internal memory 901, a display 904, and to a speaker 964. Additionally, the mobile device may have an antenna 924 for sending and receiving electromagnetic radiation coupled to the processor 902. In some aspects, the mobile device 900 may include one or more specialized or general purpose processors 905, 924 which may include systems on chips. Mobile devices typically also include a key pad or miniature keyboard and menu selection buttons or rocker switches for receiving user inputs.

Figure 10:
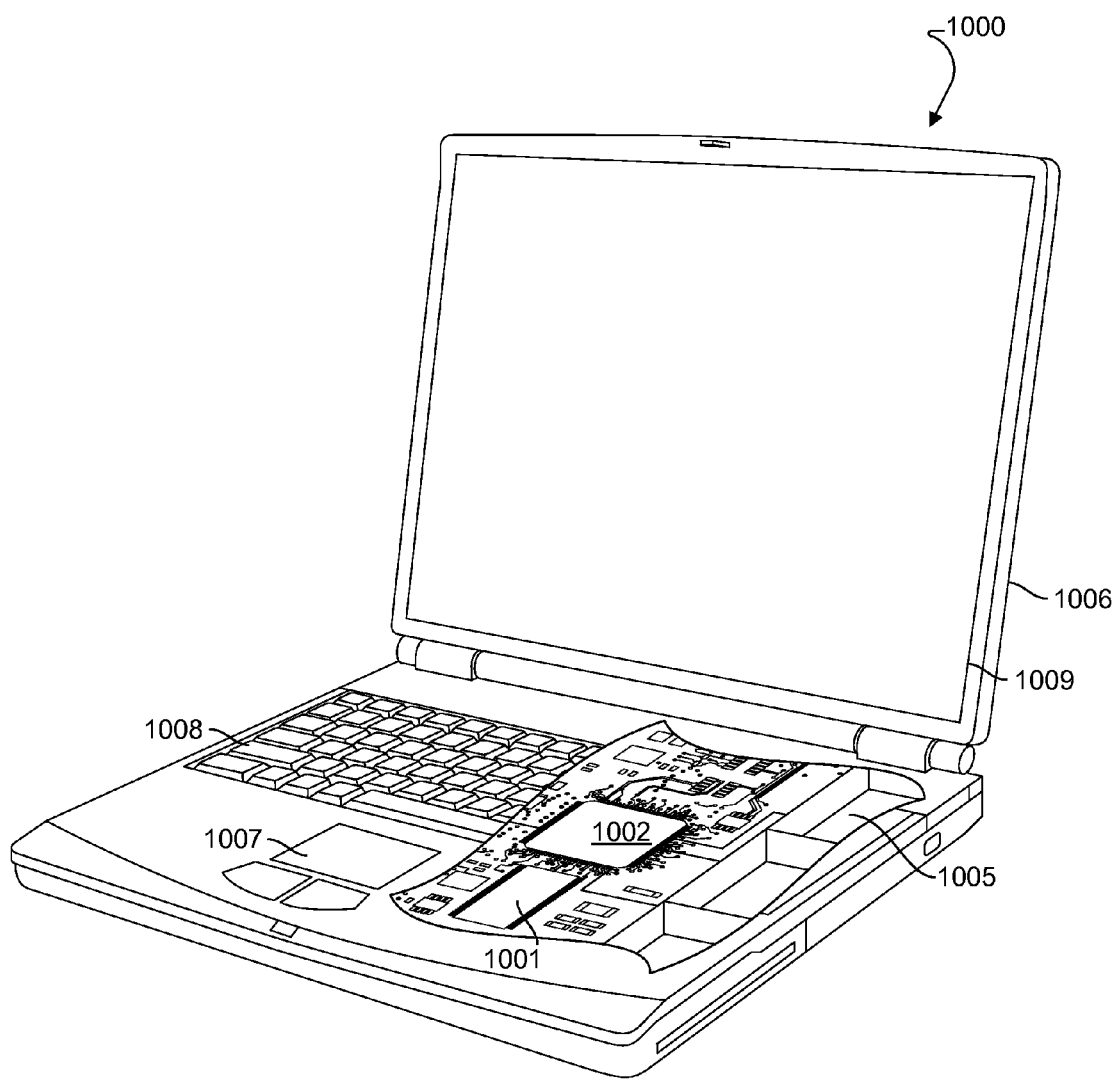
FIG. 10 is a component block diagram illustrating another mobile device suitable for implementing the various aspects.

Other forms of computing devices, such as a laptop computer 1000 illustrated in FIG. 10, may also implement and benefit from the various aspects. Computing devices like a laptop computer 1000 typically include a processor 1002 coupled to internal memory 1001, and a display 1009. Additionally, computing devices may have a communication port 1005 for sending and receiving information. Computing devices may also include a keyboard 1008 and selection buttons 1007 for receiving user inputs.

The processors 902, 905, 924, 1002 used in computing devices implementing the various aspects may be any programmable microprocessor, microcomputer, or multiple processor chip or chips that can be configured by processor-executable software instructions (applications) to perform a variety of functions, including the functions of the various aspects described herein. Typically, software applications and processor-executable instructions may be stored in the internal memory 901, 1001 before they are accessed and loaded into the processors 902, 905, 924, 1002. In some mobile devices, the processors 902, 905, 924, 1002 may include internal memory sufficient to store the application software instructions. In some mobile devices, the secure memory may be in a separate memory chip coupled to the processor 902, 905, 924, 1002. In many mobile devices, the internal memory 901, 1001 may be a volatile or nonvolatile memory, such as flash memory, or a mixture of both. For the purposes of this description, a general reference to memory refers to all memory accessible by the processors 902, 905, 924, 1002 including internal memory, removable memory plugged into the mobile device, and memory within the processors.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing memory on a computing system having a memory, the method comprising:

collecting memory performance data of the memory;
generating an energy consumption model and a memory performance model of the memory using the collected memory performance data and
allocating memory space on the computing system, comprising:
translating an intermediate physical address to a physical address in a monitor agent based on the energy consumption model and the memory performance model, the monitor agent assigning the physical address based on a characteristic of the memory and a characteristic of one or more processes of the computing system.

2. The method of claim 1, wherein allocating memory space on the computing system comprises allocating memory space for a software process.

3. The method of claim 1, wherein allocating memory space on the computing system comprises allocating memory space for a hardware accelerator.

4. The method of claim 1, wherein allocating memory space on the computing system comprises allocating memory space for a combination of software processes and hardware accelerators.

5. The method of claim 1, wherein translating an intermediate physical address to a physical address in a monitor agent comprises translating the intermediate physical address to the physical address in a hypervisor.

6. The method of claim 1, wherein translating an intermediate physical address to a physical address in a monitor agent comprises translating the intermediate physical address to the physical address in monitor software outside of an operating system of the computing system.

7. The method of claim 1, wherein translating an intermediate physical address to a physical address in a monitor agent comprises translating the intermediate physical address to the physical address in a hardware layer component.

8. The method of claim 1, wherein translating an intermediate physical address to a physical address in a monitor agent comprises translating the intermediate physical address to the physical address in a software monitor running as part of a device driver.

9. The method of claim 1, wherein allocating memory space on the computing system further comprises:
translating a virtual address to the intermediate physical address in an operating system.

10. The method of claim 1, wherein the memory is a hybrid memory and assigning the physical address based on a characteristic of the memory and a characteristic of one or more processes of the computing system comprises assigning the physical address based on a characteristic of the hybrid memory.

11. The method of claim 10, wherein assigning the physical address based on a characteristic of the hybrid memory and the characteristic of one or more processes comprises assigning the physical address based on one or more of:
a performance characteristic of the hybrid memory,
a power consumption characteristic of the hybrid memory, and
a latency characteristic of the hybrid memory.

12. The method of claim 10, wherein assigning the physical address based on a characteristic of the hybrid memory and a characteristic of one or more processes comprises assigning the physical address based on a performance characteristic of the one or more processes.

13. The method of claim 10, wherein:
the hybrid memory includes two or more types of memory technologies; and
assigning the physical address based on a characteristic of the hybrid memory and a characteristic of one or more processes comprises assigning the physical address based on the types of memory technologies included in the hybrid memory.

14. The method of claim 10, further comprising determining when the computing system is entering a lower performance state,
wherein assigning the physical address based on a characteristic of the hybrid memory and a characteristic of one or more processes comprises assigning energy-efficient portions of the hybrid memory to any software application running on the computing system in response to determining that the computing system is entering a lower performance state.

15. The method of claim 14, further comprising determining when the computing system is exiting the lower performance state,
wherein assigning the physical address based on a characteristic of the hybrid memory and a characteristic of one or more processes comprises reassigning less energy-efficient portions of the hybrid memory to the software application in response to determining that the application requesting memory cannot be assigned energy-efficient memory and that the computing system is exiting the lower performance state.

16. The method of claim 10, further comprising determining whether the one or more processes include a demanding process.

17. The method of claim 16, wherein determining whether the one or more processes include a demanding process comprises determining whether the one or more processes include a process associated with one or more of:
a multimedia application;
a video player application;
a streaming video application;
a virtual reality application;
an augmented reality application;
a gaming application;
a computer vision application;
a video conferencing application;
a gesture-recognition application; and
a speech recognition application.

18. The method of claim 16, wherein assigning the physical address based on a characteristic of the hybrid memory and a characteristic of one or more processes comprises:
assigning a fast portion of the hybrid memory to an application program associated with the demanding process and assigning a slow portion of the hybrid memory to an application program associated with another process when it is determined that the one or more processes include a demanding process.

19. The method of claim 16, wherein assigning the physical address based on a characteristic of the hybrid memory and a characteristic of one or more processes comprises:
assigning a fast portion of the hybrid memory to a hardware accelerator associated with the demanding process and assigning a slow portion of the hybrid memory to a hardware accelerator associated with another process when it is determined that the one or more processes include a demanding process.

20. The method of claim 16, further comprising determining memory speed requirements for the demanding process, wherein assigning the physical address based on a characteristic of the hybrid memory and a characteristic of one or more processes comprises:

assigning a fast portion of the hybrid memory to an application program associated with the demanding process and assigning a slow portion of the hybrid memory to an application program associated with another processes in response to determining that the memory speed requirements of the demanding process are high.

21. The method of claim 16, further comprising determining memory speed requirements for the demanding process, wherein assigning the physical address based on a characteristic of the hybrid memory and a characteristic of one or more processes comprises:
assigning a fast portion of the hybrid memory to a hardware accelerator associated with the demanding process; and
assigning slow portions of the hybrid memory to one or more hardware accelerators associated with one or more other processes.

22. The method of claim 16, further comprising determining whether the demanding process can be assigned energy-efficient memory, wherein assigning the physical address based on a characteristic of the hybrid memory and a characteristic of one or more processes comprises:
assigning energy-efficient portions of the hybrid memory to an application program associated with the demanding process in response to determining that the demanding process can be assigned energy-efficient memory; and
assigning less energy-efficient portions of the hybrid memory to the application program associated with the demanding process in response to determining that the demanding process cannot be assigned energy-efficient memory.

23. A computing device, comprising:
a memory; and
a processor coupled to the memory, wherein the processor is configured with processor-executable instructions to perform operations comprising:
collecting memory performance data of the memory;
generating an energy consumption model and a memory performance model of the memory using the collected memory performance data and
allocating memory space on the computing device, comprising:
translating an intermediate physical address to a physical address in a monitor agent process based on the energy consumption model and the memory performance model, the monitor agent process assigning the physical address based on a characteristic of the memory and a characteristic of one or more processes running on the computing device.

24. The computing device of claim 23, wherein the processor is configured with processor-executable instructions to perform operations such that allocating memory space on the computing device comprises allocating memory space for a software process.

25. The computing device of claim 23, wherein the processor is configured with processor-executable instructions to perform operations such that allocating memory space on the computing device comprises allocating memory space for a hardware accelerator.

26. The computing device of claim 23, wherein the processor is configured with processor-executable instructions to perform operations such that allocating memory space on the computing device comprises allocating memory space for a combination of software processes and hardware accelerators.

27. The computing device of claim 23, wherein the processor is configured with processor-executable instructions to perform operations such that translating an intermediate physical address to a physical address comprises a hypervisor translating the intermediate physical address to the physical address.

28. The computing device of claim 23, wherein the processor is configured with processor-executable instructions to perform operations such that translating an intermediate physical address to a physical address comprises monitor software running outside of operating system translating the intermediate physical address to the physical address.

29. The computing device of claim 23, wherein the processor is configured with processor-executable instructions to perform operations such that translating an intermediate physical address to a physical address comprises a device driver translating the intermediate physical address to the physical address.

30. The computing device of claim 23, wherein the processor is configured with processor-executable instructions to perform operations such that allocating memory space on the computing device further comprises:
translating a virtual address to the intermediate physical address in an operating system process.

31. The computing device of claim 23, wherein the memory is a hybrid memory and assigning the physical address based on a characteristic of the memory and a characteristic of one or more processes running on the computing device comprises assigning the physical address based on a characteristic of the hybrid memory.

32. The computing device of claim 31, wherein the processor is configured with processor-executable instructions to perform operations such that assigning the physical address based on a characteristic of the hybrid memory and a characteristic of one or more processes comprises assigning the physical address based on one or more of:
a performance characteristic of the hybrid memory,
a power consumption characteristic of the hybrid memory, and
a latency characteristic of the hybrid memory.

33. The computing device of claim 31, wherein the processor is configured with processor-executable instructions to perform operations such that assigning the physical address based on a characteristic of the hybrid memory and a characteristic of one or more processes comprises assigning the physical address based on a performance characteristic of the one or more processes.

34. The computing device of claim 31, wherein the hybrid memory includes two or more types of memory technologies, and wherein the processor is configured with processor-executable instructions to perform operations such that assigning the physical address based on a characteristic of the hybrid memory and a characteristic of one or more processes comprises assigning the physical address based on the types of memory technologies included in the hybrid memory.

35. The computing device of claim 31, wherein:
the processor is configured with processor-executable instructions to perform operations further comprising determining when the computing device is entering a lower performance state, and
the processor is configured with processor-executable instructions to perform operations such that assigning the physical address based on a characteristic of the hybrid memory and a characteristic of one or more processes comprises assigning energy-efficient portions of the hybrid memory to a software application in response to determining that the computing device is entering a lower performance state.

36. The computing device of claim 35, wherein:
the processor is configured with processor-executable instructions to perform operations further comprising determining when the computing device is exiting the lower performance state, and
the processor is configured with processor-executable instructions to perform operations such that assigning the physical address based on a characteristic of the hybrid memory and a characteristic of one or more processes comprises reassigning less energy-efficient portions of the hybrid memory to the software application in response to determining that the application requesting memory cannot be assigned energy-efficient memory and that the computing device is exiting the lower performance state.

37. The computing device of claim 31, wherein the processor is configured with processor-executable instructions to perform operations further comprising:
determining whether the one or more processes include a demanding process.

38. The computing device of claim 37, wherein the processor is configured with processor-executable instructions to perform operations such that determining whether the one or more processes include a demanding process comprises determining whether the one or more processes include a process associated with one or more of:
a multimedia application;
a video player application;
a streaming video application;
a virtual reality application;
an augmented reality application;
a gaming application;
a computer vision application;
a video conferencing application;
a gesture-recognition application; and
a speech recognition application.

39. The computing device of claim 37, wherein the processor is configured with processor-executable instructions to perform operations such that assigning the physical address based on a characteristic of the hybrid memory and a characteristic of one or more processes comprises:
assigning a fast portion of the hybrid memory to an application program associated with the demanding process and assigning a slow portion of the hybrid memory to an application program associated with another process when it is determined that the one or more processes include a demanding process.

40. The computing device of claim 37, wherein the processor is configured with processor-executable instructions to perform operations such that assigning the physical address based on a characteristic of the hybrid memory and a characteristic of one or more processes comprises:
assigning a fast portion of the hybrid memory to a hardware accelerator associated with the demanding process and assigning a slow portion of the hybrid memory to a hardware accelerator associated with another process when it is determined that the one or more processes include a demanding process.

41. The computing device of claim 37, wherein:
the processor is configured with processor-executable instructions to perform operations further comprising determining memory speed requirements for the demanding process, and
the processor is configured with processor-executable instructions to perform operations such that assigning the physical address based on a characteristic of the hybrid memory and a characteristic of one or more processes comprises:
assigning a fast portion of the hybrid memory to an application program associated with the demanding process and assigning a slow portion of the hybrid memory to an application program associated with another processes in response to determining that the memory speed requirements of the demanding process are high.

42. The computing device of claim 37, wherein:
the processor is configured with processor-executable instructions to perform operations further comprising determining memory speed requirements for the demanding process, and
the processor is configured with processor-executable instructions to perform operations such that assigning the physical address based on a characteristic of the hybrid memory and a characteristic of one or more processes comprises:
assigning a fast portion of the hybrid memory to a hardware accelerator associated with the demanding process; and
assigning slow portions of the hybrid memory to one or more hardware accelerators associated with one or more other processes.

43. The computing device of claim 37, wherein:
the processor is configured with processor-executable instructions to perform operations further comprising determining whether the demanding process can be assigned energy-efficient memory, and
the processor is configured with processor-executable instructions to perform operations such that assigning the physical address based on a characteristic of the hybrid memory and a characteristic of one or more processes comprises:
assigning energy-efficient portions of the hybrid memory to an application program associated with the demanding process in response to determining that the demanding process can be assigned energy-efficient memory; and
assigning less energy-efficient portions of the hybrid memory to the application program associated with the demanding process in response to determining that the demanding process cannot be assigned energy-efficient memory.

44. A computing device, comprising:
a memory;
a hardware layer component;
a processor coupled to the memory and the hardware layer component,
wherein the processor is configured with processor-executable instructions to perform operations comprising:
collecting memory performance data of the memory;
generating an energy consumption model and a memory performance model of the memory using the collected memory performance data and
allocating memory space on the computing device;
wherein the hardware layer component is configured to translate an intermediate physical address to a physical address based on the energy consumption model and the memory performance model by assigning the physical address based on a characteristic of the memory and a characteristic of one or more processes running on the computing device.

45. The computing device of claim 44, wherein the processor is configured with processor-executable instructions to perform operations such that allocating memory space on the computing device comprises allocating memory space for a software process.

46. The computing device of claim 44, wherein the processor is configured with processor-executable instructions to perform operations such that allocating memory space on the computing device comprises allocating memory space for a hardware accelerator.

47. The computing device of claim 44, wherein the processor is configured with processor-executable instructions to perform operations such that allocating memory space on the computing device comprises allocating memory space for a combination of software processes and hardware accelerators.

48. The computing device of claim 44, wherein the processor is configured with processor-executable instructions to perform operations such that allocating memory space on the computing device comprises allocating memory space on the computing device by translating a virtual address to the intermediate physical address in an operating system.

49. The computing device of claim 44, wherein the memory is a hybrid memory and the hardware layer component is configured such that assigning the physical address based on a characteristic of the memory and a characteristic of one or more processes of the computing device comprises assigning the physical address based on a characteristic of the hybrid memory.

50. The computing device of claim 49, wherein the hardware layer component is configured such that assigning the physical address based on a characteristic of the hybrid memory and a characteristic of one or more processes comprises assigning the physical address based on one or more of:
  a performance characteristic of the hybrid memory,
  a power consumption characteristic of the hybrid memory, and
  a latency characteristic of the hybrid memory.

51. The computing device of claim 49, wherein the hardware layer component is configured such that assigning the physical address based on a characteristic of the hybrid memory and a characteristic of one or more processes comprises assigning the physical address based on a performance characteristic of the one or more processes.

52. The computing device of claim 49, wherein the hybrid memory includes two or more types of memory technologies, and wherein the hardware layer component is configured such that assigning the physical address based on a characteristic of the hybrid memory and a characteristic of one or more processes comprises assigning the physical address based on the types of memory technologies included in the hybrid memory.

53. The computing device of claim 49, wherein:
  the processor is configured with processor-executable instructions to perform operations comprising determining when the computing device is entering a lower performance state, and
  the hardware layer component is configured such that assigning the physical address based on a characteristic of the hybrid memory and a characteristic of one or more processes comprises assigning energy-efficient portions of the hybrid memory to a software application in response to determining that the computing device is entering a lower performance state.

54. The computing device of claim 53, wherein:
  the processor is configured with processor-executable instructions to perform operations further comprising determining when the computing device is exiting the lower performance state, and
  the hardware layer component is configured such that assigning the physical address based on a characteristic of the hybrid memory and a characteristic of one or more processes comprises reassigning less energy-efficient portions of the hybrid memory to the software application in response to determining that the application requesting memory cannot be assigned energy-efficient memory and that the computing device is exiting the lower performance state.

55. The computing device of claim 49, wherein the processor is configured with processor-executable instructions to perform operations further comprising determining whether the one or more processes include a demanding process.

56. The computing device of claim 55, wherein the processor is configured with processor-executable instructions to perform operations such that determining whether the one or more processes include a demanding process comprises determining whether the one or more processes include a process associated with one or more of:
  a multimedia application;
  a video player application;
  a streaming video application;
  a virtual reality application;
  an augmented reality application;
  a gaming application;
  a computer vision application;
  a video conferencing application;
  a gesture-recognition application; and
  a speech recognition application.

57. The computing device of claim 55, wherein the hardware layer component is configured such that assigning the physical address based on a characteristic of the hybrid memory and a characteristic of one or more processes comprises:
  assigning a fast portion of the hybrid memory to an application program associated with the demanding process and assigning a slow portion of the hybrid memory to an application program associated with another process when it is determined that the one or more processes include a demanding process.

58. The computing device of claim 55, wherein the hardware layer component is configured such that assigning the physical address based on a characteristic of the hybrid memory and a characteristic of one or more processes comprises:
  assigning a fast portion of the hybrid memory to a hardware accelerator associated with the demanding process and assigning a slow portion of the hybrid memory to a hardware accelerator associated with another process when it is determined that the one or more processes include a demanding process.

59. The computing device of claim 55, wherein:
  the processor is configured with processor-executable instructions to perform operations further comprising determining memory speed requirements for the demanding process, and
  the hardware layer component is configured such that assigning the physical address based on a characteristic of the hybrid memory and a characteristic of one or more processes comprises:
    assigning a fast portion of the hybrid memory to an application program associated with the demanding process and assigning a slow portion of the hybrid memory to an application program associated with another processes in response to determining that the memory speed requirements of the demanding process are high.

60. The computing device of claim 55, wherein:
the processor is configured with processor-executable instructions to perform operations further comprising determining memory speed requirements for the demanding process, and
the hardware layer component is configured such that assigning the physical address based on a characteristic of the hybrid memory and a characteristic of one or more processes comprises:
assigning a fast portion of the hybrid memory to a hardware accelerator associated with the demanding process; and
assigning slow portions of the hybrid memory to one or more hardware accelerators associated with one or more other processes.

61. The computing device of claim 55, wherein:
the processor is configured with processor-executable instructions to perform operations further comprising determining whether the demanding process can be assigned energy-efficient memory, and
the hardware layer component is configured such that assigning the physical address based on a characteristic of the hybrid memory and a characteristic of one or more processes comprises:
assigning energy-efficient portions of the hybrid memory to an application program associated with the demanding process in response to determining that the demanding process can be assigned energy-efficient memory; and
assigning less energy-efficient portions of the hybrid memory to the application program associated with the demanding process in response to determining that the demanding process cannot be assigned energy-efficient memory.

62. A computing device, comprising:
means for collecting memory performance data of a memory;
means for generating an energy consumption model and a memory performance model of the memory using the collected memory performance data; and
means for allocating memory space on the computing device, comprising:
means for translating an intermediate physical address to a physical address in a monitor agent based on the energy consumption model and the memory performance model, the monitor agent assigning the physical address based on a characteristic of the memory and a characteristic of one or more processes running on the computing device.

63. The computing device of claim 62, wherein means for allocating memory space on the computing device comprises means for allocating memory space for a software process.

64. The computing device of claim 62, wherein means for allocating memory space on the computing device comprises means for allocating memory space for a hardware accelerator.

65. The computing device of claim 62, wherein means for allocating memory space on the computing device comprises means for allocating memory space for a combination of software processes and hardware accelerators.

66. The computing device of claim 62, wherein means for translating the intermediate physical address to a physical address in a monitor agent comprises means for translating the intermediate physical address to the physical address in a hypervisor.

67. The computing device of claim 62, wherein means for translating the intermediate physical address to a physical address in a monitor agent comprises means for translating the intermediate physical address to the physical address in monitor software outside of an operating system of the computing device.

68. The computing device of claim 62, wherein means for translating the intermediate physical address to a physical address in a monitor agent comprises means for translating the intermediate physical address to the physical address in a hardware layer component.

69. The computing device of claim 62, wherein means for translating the intermediate physical address to a physical address in a monitor agent comprises means for translating the intermediate physical address to the physical address in a software monitor running as part of a device driver.

70. The computing device of claim 62, wherein means for allocating memory space on the computing device further comprises means for translating a virtual address to the intermediate physical address in an operating system.

71. The computing device of claim 62, wherein means for assigning the physical address based on a characteristic of the memory and a characteristic of one or more processes of the computing device comprises means for assigning the physical address based on a characteristic of a hybrid memory.

72. The computing device of claim 71, wherein means for assigning the physical address based on a characteristic of the hybrid memory and a characteristic of one or more processes comprises means for assigning the physical address based on one or more of:
a performance characteristic of the hybrid memory,
a power consumption characteristic of the hybrid memory, and
a latency characteristic of the hybrid memory.

73. The computing device of claim 71, wherein means for assigning the physical address based on a characteristic of the hybrid memory and a characteristic of one or more processes comprises means for assigning the physical address based on a performance characteristic of the one or more processes.

74. The computing device of claim 71, wherein means for assigning the physical address based on a characteristic of the hybrid memory and a characteristic of one or more processes comprises means for assigning the physical address based on two or more types of memory technologies included in the hybrid memory.

75. The computing device of claim 71, further comprising means for determining when the computing device is entering a lower performance state,
wherein means for assigning the physical address based on a characteristic of the hybrid memory and a characteristic of one or more processes comprises means for assigning energy-efficient portions of the hybrid memory to a software application in response to determining that the computing device is entering a lower performance state.

76. The computing device of claim 75, further comprising means for determining when the computing device is exiting the lower performance state,
wherein means for assigning the physical address based on a characteristic of the hybrid memory and a characteristic of one or more processes comprises means for reassigning less energy-efficient portions of the hybrid memory to the software application running in response to determining that the application requesting memory cannot be assigned energy-efficient memory and that the computing device is exiting the lower performance state.

77. The computing device of claim 71, further comprising:
means for determining whether the one or more processes include a demanding process.

78. The computing device of claim 77, wherein means for determining whether the one or more processes include a demanding process comprises means for determining whether the one or more processes include a process associated with one or more of:
a multimedia application;
a video player application;
a streaming video application;
a virtual reality application;
an augmented reality application;
a gaming application;
a computer vision application;
a video conferencing application;
a gesture-recognition application; and
a speech recognition application.

79. The computing device of claim 77, wherein means for assigning the physical address based on a characteristic of the hybrid memory and a characteristic of one or more processes comprises:
means for assigning a fast portion of the hybrid memory to an application program associated with the demanding process and assigning a slow portion of the hybrid memory to an application program associated with another process when it is determined that the one or more processes include a demanding process.

80. The computing device of claim 77, wherein means for assigning the physical address based on a characteristic of the hybrid memory and a characteristic of one or more processes comprises:
means for assigning a fast portion of the hybrid memory to a hardware accelerator associated with the demanding process and assigning a slow portion of the hybrid memory to a hardware accelerator associated with another process when it is determined that the one or more processes include a demanding process.

81. The computing device of claim 77, further comprising means for determining memory speed requirements for the demanding process, wherein means for assigning the physical address based on a characteristic of the hybrid memory and a characteristic of one or more processes comprises:
means for assigning a fast portion of the hybrid memory to an application program associated with the demanding process and assigning a slow portion of the hybrid memory to an application program associated with another processes in response to determining that the memory speed requirements of the demanding process are high.

82. The computing device of claim 77, further comprising means for determining memory speed requirements for the demanding process, wherein means for assigning the physical address based on a characteristic of the hybrid memory and a characteristic of one or more processes comprises:
means for assigning a fast portion of the hybrid memory to a hardware accelerator associated with the demanding process; and
means for assigning slow portions of the hybrid memory to one or more hardware accelerators associated with one or more other processes.

83. The computing device of claim 77, further comprising means for determining whether the demanding process can be assigned energy-efficient memory, wherein means for assigning the physical address based on a characteristic of the hybrid memory and a characteristic of one or more processes comprises:
means for assigning energy-efficient portions of the hybrid memory to an application program associated with the demanding process in response to determining that the demanding process can be assigned energy-efficient memory; and
means for assigning less energy-efficient portions of the hybrid memory to the application program associated with the demanding process in response to determining that the demanding process cannot be assigned energy-efficient memory.

84. A non-transitory computer readable storage medium having stored thereon processor-executable software instructions configured to cause a processor to perform operations for managing memory on a computing device having a memory, the operations comprising:
collecting memory performance data of the memory;
generating an energy consumption model and a memory performance model of the memory using the collected memory performance data; and
allocating memory space on the computing device, comprising:
translating an intermediate physical address to a physical address in a monitor agent process based on the energy consumption model and the memory performance model, the monitor agent process assigning the physical address based on a characteristic of the memory and a characteristic of one or more processes running on the computing device.

85. The non-transitory computer readable storage medium of claim 84, wherein the stored processor-executable software instructions are configured to cause a processor to perform operations such that allocating memory space on the computing device comprises allocating memory space for a software process.

86. The non-transitory computer readable storage medium of claim 84, wherein the stored processor-executable software instructions are configured to cause a processor to perform operations such that allocating memory space on the computing device comprises allocating memory space for a hardware accelerator.

87. The non-transitory computer readable storage medium of claim 84, wherein the stored processor-executable software instructions are configured to cause a processor to perform operations such that allocating memory space on the computing device comprises allocating memory space for a combination of software processes and hardware accelerators.

88. The non-transitory computer readable storage medium of claim 84, wherein the stored processor-executable software instructions are configured to cause a processor to perform operations such that translating the intermediate physical address to a physical address comprises translating the intermediate physical address to the physical address in a hypervisor.

89. The non-transitory computer readable storage medium of claim 84, wherein the stored processor-executable software instructions are configured to cause a processor to perform operations such that translating the intermediate physical address to a physical address comprises translating the intermediate physical address to the physical address in monitor software running outside of an operating system.

90. The non-transitory computer readable storage medium of claim 84, wherein the stored processor-executable software instructions are configured to cause a processor to perform operations such that translating the intermediate physical address to a physical address comprises translating the intermediate physical address to the physical address in a device driver.

91. The non-transitory computer readable storage medium of claim 84, wherein the stored processor-executable software instructions are configured to cause a processor to perform operations such that allocating memory space on the computing device comprises translating a virtual address to the intermediate physical address in an operating system process.

92. The non-transitory computer readable storage medium of claim 84, wherein the stored processor-executable software instructions are configured to cause a processor to perform operations such that assigning the physical address based on a characteristic of the memory and a characteristic of one or more processes running on the computing device comprises assigning the physical address based on a characteristic of a hybrid memory.

93. The non-transitory computer readable storage medium of claim 92, wherein the stored processor-executable software instructions are configured to cause a processor to perform operations such that assigning the physical address based on a characteristic of the hybrid memory and a characteristic of one or more processes comprises assigning the physical address based on one or more of:
 a performance characteristic of the hybrid memory,
 a power consumption characteristic of the hybrid memory, and
 a latency characteristic of the hybrid memory.

94. The non-transitory computer readable storage medium of claim 92, wherein the stored processor-executable software instructions are configured to cause a processor to perform operations such that assigning the physical address based on a characteristic of the hybrid memory and a characteristic of one or more processes comprises:
 assigning the physical address based on a performance characteristic of the one or more processes.

95. The non-transitory computer readable storage medium of claim 92, wherein the hybrid memory includes two or more types of memory technologies, and wherein the stored processor-executable software instructions are configured to cause a processor to perform operations such that assigning the physical address based on a characteristic of the hybrid memory and a characteristic of one or more processes comprises:
 assigning the physical address based on the types of memory technologies included in the hybrid memory.

96. The non-transitory computer readable storage medium of claim 92, wherein:
 the stored processor-executable software instructions are configured to cause a processor to perform operations further comprising determining when the computing device is entering a lower performance state, and
 the stored processor-executable software instructions are configured to cause a processor to perform operations such that assigning the physical address based on a characteristic of the hybrid memory and a characteristic of one or more processes comprises assigning energy-efficient portions of the hybrid memory to a software application in response to determining that the computing device is entering a lower performance state.

97. The non-transitory computer readable storage medium of claim 96, wherein:
 the stored processor-executable software instructions are configured to cause a processor to perform operations further comprising determining when the computing device is exiting the lower performance state, and
 the stored processor-executable software instructions are configured to cause a processor to perform operations such that assigning the physical address based on a characteristic of the hybrid memory and a characteristic of one or more processes comprises reassigning less energy-efficient portions of the hybrid memory to the software application running in response to determining that the application requesting memory cannot be assigned energy-efficient memory and that the computing device is exiting the lower performance state.

98. The non-transitory computer readable storage medium of claim 92, wherein the stored processor-executable software instructions are configured to cause a processor to perform operations comprising:
 determining whether the one or more processes include a demanding process.

99. The non-transitory computer readable storage medium of claim 98, wherein the stored processor-executable software instructions are configured to cause a processor to perform operations such that determining whether the one or more processes include a demanding process comprises determining whether the one or more processes include a process associated with one or more of:
 a multimedia application;
 a video player application;
 a streaming video application;
 a virtual reality application;
 an augmented reality application;
 a gaming application;
 a computer vision application;
 a video conferencing application;
 a gesture-recognition application; and
 a speech recognition application.

100. The non-transitory computer readable storage medium of claim 98, wherein the stored processor-executable software instructions are configured to cause a processor to perform operations such that assigning the physical address based on a characteristic of the hybrid memory and a characteristic of one or more processes comprises:
 assigning a fast portion of the hybrid memory to an application program associated with the demanding process and assigning a slow portion of the hybrid memory to an application program associated with another process when it is determined that the one or more processes include a demanding process.

101. The non-transitory computer readable storage medium of claim 98, wherein the stored processor-executable software instructions are configured to cause a processor to perform operations such that assigning the physical address based on a characteristic of the hybrid memory and a characteristic of one or more processes comprises:
 assigning a fast portion of the hybrid memory to a hardware accelerator associated with the demanding process and assigning a slow portion of the hybrid memory to a hardware accelerator associated with another process when it is determined that the one or more processes include a demanding process.

102. The non-transitory computer readable storage medium of claim 98, wherein:
 the stored processor-executable software instructions are configured to cause a processor to perform operations comprising determining memory speed requirements for the demanding process, and
 the stored processor-executable software instructions are configured to cause a processor to perform operations such that assigning the physical address based on a characteristic of the hybrid memory and a characteristic of one or more processes comprises:
 assigning a fast portion of the hybrid memory to an application program associated with the demanding process and assigning a slow portion of the hybrid memory to an application program associated with another processes in response to determining that the memory speed requirements of the demanding process are high.

103. The non-transitory computer readable storage medium of claim 98, wherein:
the stored processor-executable software instructions are configured to cause a processor to perform operations comprising determining memory speed requirements for the demanding process, and
the stored processor-executable software instructions are configured to cause a processor to perform operations such that assigning the physical address based on a characteristic of the hybrid memory and a characteristic of one or more processes comprises:
assigning a fast portion of the hybrid memory to a hardware accelerator associated with the demanding process; and
assigning slow portions of the hybrid memory to one or more hardware accelerators associated with one or more other processes.

104. The non-transitory computer readable storage medium of claim 98, wherein:
the stored processor-executable software instructions are configured to cause a processor to perform operations comprising determining whether the demanding process can be assigned energy-efficient memory, and
the stored processor-executable software instructions are configured to cause a processor to perform operations such that assigning the physical address based on a characteristic of the hybrid memory and a characteristic of one or more processes comprises:
assigning energy-efficient portions of the hybrid memory to an application program associated with the demanding process in response to determining that the demanding process can be assigned energy-efficient memory; and
assigning less energy-efficient portions of the hybrid memory to the application program associated with the demanding process in response to determining that the demanding process cannot be assigned energy-efficient memory.

\* \* \* \* \*